(12) United States Patent
Tole et al.

(10) Patent No.: US 10,367,374 B2
(45) Date of Patent: Jul. 30, 2019

(54) SYSTEM AND METHOD FOR WIRELESS SHARING OF ELECTRICAL POWER IN A WIRELESS MESH NETWORK

(71) Applicant: Azbil North America Research and Development, Inc., Santa Clara, CA (US)

(72) Inventors: Jeremy Tole, San Jose, CA (US); Peter Walther, Los Gatos, CA (US); Tasuku Imanishi, Santa Clara, CA (US)

(73) Assignee: Azbil North America Research and Development, Inc., Santa Clara, CA (US)

(*) Notice: Subject to any disclaimer, the term of this patent is extended or adjusted under 35 U.S.C. 154(b) by 540 days.

(21) Appl. No.: 15/220,865

(22) Filed: Jul. 27, 2016

(65) Prior Publication Data

US 2018/0034321 A1    Feb. 1, 2018

(51) Int. Cl.
*H02J 50/80* (2016.01)
*H02J 50/12* (2016.01)
*H02J 50/40* (2016.01)
*H02J 7/02* (2016.01)

(52) U.S. Cl.
CPC ............. *H02J 50/12* (2016.02); *H02J 7/025* (2013.01); *H02J 50/40* (2016.02); *H02J 50/80* (2016.02)

(58) Field of Classification Search
CPC .................................................... H02J 50/80
See application file for complete search history.

(56) References Cited

U.S. PATENT DOCUMENTS

| 6,459,171 B1 * | 10/2002 | Leifer ................ H02J 1/10 307/24 |
| 9,860,358 B2 * | 1/2018 | Park .................. H04M 1/7253 |
| 2014/0217967 A1 | 8/2014 | Zeine et al. |
| 2015/0022022 A1 | 1/2015 | Zeine |
| 2015/0207542 A1 | 7/2015 | Zeine |
| 2015/0326024 A1 | 11/2015 | Bell et al. |

(Continued)

OTHER PUBLICATIONS

Wireless Mesh Network; Wikipedia, printed May 2, 2016, 6pp.; https://en.wikipedia.org/wiki/Wireless_mesh_network.

(Continued)

*Primary Examiner* — Hai L Nguyen
(74) *Attorney, Agent, or Firm* — Amster, Rothstein & Ebenstein LLP

(57) ABSTRACT

Electrical power is shared wirelessly among electrical power-sharing hubs in a wireless mesh network. Each electrical power-sharing hub includes one or more transmitters and receivers for wireless communications with other hubs and wireless power transfer technology to transmit or receive electrical power with other hubs. If electrical power at a respective electrical power-sharing hub is insufficient to power an electrical load on the hub, the hub wirelessly requests that a specific amount of electrical power be transmitted to it wirelessly from one or more neighboring electrical power-sharing hubs. At least one of the neighboring hubs may send a portion or all of the requested power. If the neighboring hubs do not have electrical power to share, a request for power is wirelessly transmitted to non-neighboring hubs, at least one of which may relay available electrical power wirelessly to the requesting hub via the wireless mesh network.

26 Claims, 22 Drawing Sheets

(56) References Cited

U.S. PATENT DOCUMENTS

| | | |
|---|---|---|
| 2015/0326025 A1 | 11/2015 | Bell et al. |
| 2015/0326051 A1 | 11/2015 | Bell et al. |
| 2015/0326068 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2016/0012695 A1 | 1/2016 | Bell et al. |
| 2016/0013656 A1 | 1/2016 | Bell et al. |
| 2016/0013685 A1 | 1/2016 | Zeine |
| 2016/0020616 A1 | 1/2016 | Leabman et al. |
| 2016/0020647 A1 | 1/2016 | Leabman et al. |
| 2016/0020649 A1 | 1/2016 | Bell et al. |

OTHER PUBLICATIONS

Wireless Power Transfer; Wikipedia, from www.archive.org, printed Apr. 9, 2016, 19pp.; http://web.archive.org/web/20160409092320/https://en.wikipedia.org/wiki/Wireless_power_transfer.

Rezence (Wireless Charging Standard); Wikipedia, from www.archive.org., dated Nov. 26, 2015, pp. 1-2; http://web.archive.org/web/20151126064235/https://en.wikipedia.org/wiki/Rezence_(Wireless_Charging_Standard).

Pages from AirFuel Alliance website, dated Jul. 11, 2016, 9pp.; http://web.archive.org/web/20170223131412/http://www.airfuel.org/index.php/home/about-us-2.

Pages re Powercast dated Apr. 28, 2016; http://www.powercastco.com/company/about/; 3pp.

Pages re WiTricity Corporation Technology, retrieved from www.archive.org, dated Apr. 2, 2016; 7pp; http://web.archive.org/web/20160402135016/http://witricity.com/technology/.

The Power of Sound; printed Apr. 5, 2016; http://ubeam.com/technology/; 10pp.

Constine, Josh; UBeam Finally Reveals the Secret of How Its Wireless Charging Phone Case Works Safely; uBeam; Oct. 8, 2015; https://techcrunch.com/2015/10/08/how-ubeam-works/; 7pp., printed Apr. 5, 2016.

Wireless Power Transmission Modules; Murata Manufacturing Co., Ltd. printed May 3, 2016; http://www.murata.com/en-us/products/power/wptm, 2pp.

Wiggers, Kyle; Digital Trends, Jan. 8, 2016; http://www.digitaltrends.com/cool-tech/ossia-cota-wireless-charging/; 11pp.

Wi-Charge; Products; printed Apr. 5, 2016, 4pp.; http://www.wi-charge.com/products/.

P2110B 915 MHz RF Powerharvester Receiver, printed Apr. 28, 2016, 11pp.

Michelle Ma, Wireless devices go battery-free with new communication technique; dated Aug. 13, 2013; 4pp.; https://web-beta.archive.org/web/20160628192528/http://www.washington.edu/news/2013/08/13/wireless-devices-go-battery-free-with-new-communication-technique.

Capacitive Coupling Wireless Power Transmission System; 2pp.; http://www.murata.com/en-us/about/newsroom/techmag/metamorphosis16/productsmarket/wireless; printed Feb. 7, 2017.

Lee Gomes; Experts Still Think uBeam's Through-the-Air Charging Tech Is Unlikely, posted Nov. 11, 2015; printed from web.archive.org, 4pp.; https://web.archive.org/web/20160505175132/http://spectrum.ieee.org/consumer-electronics/portable-devices/experts-still-think-ubeamrsquos-throughtheair-charging-tech-is-unlikely.

Peter Clark; Startup Wi-Charge Uses Infrared Light for Wireless Charging; Mar. 26, 2015, 2pp., printed from web.archive.org/.; https://web.archive.org/web/20160611215555/http://electronics360.globalspec.com/article/5176/startup-wi-charge-uses-infrared-light-for-wireless-charging.

Wireless Power, from the Qi Blog, dated Jul. 11, 2016, 20pp.; https://web.archive.org/web/20160711235118/https://www.wirelesspowerconsortium.com/.

Energous WattUp Transmitters (3pp), archived on Mar. 27, 2016; https://web-beta.archive.org/web/20160327184240/http://www.energous.com/transmitters/.

Energous WattUp Receivers (3pp), archived on Mar. 27, 2016; https://web-beta.archive.org/web/20160327185151/http://www.energous.com/receivers/.

Energous WattUp Product Overview (5pp), archived on Mar. 27, 2016; https://web-beta.archive.org/web/20160327184206/http://www.energous.com/product-overview/.

TX 91501-915 MHz Powercaster Transmitter Rev. A dated Oct. 2010 (7pp) retrieved from http://www.mouser.com/ds/2/329/TX91501-manual-3020.pdf.

\* cited by examiner

SYSTEM AND METHOD FOR WIRELESS SHARING OF ELECTRICAL POWER IN A WIRELESS MESH NETWORK

FIELD

The present invention relates to the wireless sharing of electrical power among nodes of a wireless mesh network.

BACKGROUND

Wireless power transfer technologies enable electrical power to be wirelessly transmitted in a single direction directly from a power source to an electrical load where it is consumed. Examples of various technologies that may be used for wireless power transfer include Wi-Fi, microwave, acoustic, photonics (e.g., laser), capacitive coupling, induction, and magnetic resonance technologies, to name a few. The particular technology that is used dictates, among other things, the amount of power that can be wirelessly transmitted and the transmission distance over which the power may be transferred. The type of technology used also affects the efficiency of the power transfer as the amount of electrical power that is transmitted is generally significantly larger than the amount of power that is ultimately received at the destination.

It would be advantageous to provide a method and system that is configured to enable an automated, bidirectional sharing of electrical power while extending the overall distance between the source and destination of the electrical power that is wirelessly transferred to longer ranges than is conventionally possible.

SUMMARY

The present invention generally relates to a system and method for the wireless sharing of electrical power between nodes of a wireless mesh network that are equipped to wirelessly transmit and receive communications and electrical power. Such nodes thus serve as "electrical power-sharing hubs". The electrical power that is shared wirelessly may be transmitted not just between adjacent or neighboring electrical power-sharing hubs in the wireless mesh network but may also be wirelessly relayed from a source electrical power-sharing hub via one or more intermediate electrical power-sharing hubs to a destination electrical power-sharing hub where the source and destination hubs are more than one wireless link apart from one another. The electrical power may be shared bidirectionally, as necessary, between the electrical power-sharing hubs, such that electrical power may be transmitted to or received from an electrical power-sharing, hub based on whether a hub has electrical power to share or requires snore electrical power.

In accordance with an exemplary embodiment of the present invention, a method is provided for wirelessly sharing electrical power over a wireless mesh network that comprises a plurality of electrical power-sharing hubs, including a first electrical power-sharing hub and a first set of one or more neighboring electrical power-sharing hubs that are one wireless link away from the first electrical power-sharing hub. Each of the electrical power-sharing hubs comprise one or more transmitters and one or more receivers to respectively transmit and receive wirelessly communications and electrical power, a hub-based power source or a connection to an external power source to power the first electrical power-sharing hub and electrical loads connectable thereto, and one or more controllers. The method comprises (a) determining, by the one or more controllers at the first electrical power-sharing; hub, whether electrical power is to be requested by the first electrical power-sharing hub from one or more of the plurality of electrical power-sharing hubs other than the first electrical power-sharing hub in the wireless mesh network; (b) transmitting wirelessly, by the one or more transmitters at the first electrical power-sharing hub when the one or more controllers determine that electrical power is to be requested, a first request to the first set of one or more neighboring electrical power-sharing hubs, which are one wireless link away in the wireless mesh network from the first electrical power-sharing hub, to wirelessly obtain a first amount of electrical power or a portion thereof from the one or more neighboring electrical power-sharing hubs in the first set; and (c) receiving, by the one or more receivers by wireless transmission from the one or more neighboring electrical power-sharing hubs in the first set to the first electrical power-sharing, hub in response to first request, a second amount of electrical power when the one or more of the neighboring electrical power-sharing hubs has electrical power to share with the first electrical power-sharing hub. In an exemplary embodiment, the second amount of electrical power comprises at least the first amount of electrical power that has been requested. In another exemplary embodiment, the second amount of electrical power comprises a portion of the first amount of electrical power that has been requested.

In embodiments, the plurality of electrical power-sharing hubs in the wireless mesh network further comprises a second set of one or more non-neighboring electrical power-sharing hubs in the wireless mesh network that are more than one wireless link away from the first electrical power-sharing hub. The method further comprises (d) obtaining by the first electrical power-sharing hub of a third amount of electrical power, such as at least the first amount of electrical power or a portion thereof, that has been requested from the second set of one or more non-neighboring electrical power-sharing hubs in the wireless mesh network, when the first amount of electrical power is not available for sharing by the first set of one or more of the neighboring electrical power-sharing hubs, by a relay of at least the first amount of electrical power or a portion thereof wirelessly from the one or more non-neighboring electrical power-sharing hubs that has the first amount of electrical power or a portion thereof to share back to the first electrical power-sharing hub via one or more of the plurality of electrical power-sharing hubs intermediate the non-neighboring electrical power-sharing hubs and the first electrical power-sharing hub.

In another exemplary embodiment of the present invention, a method is provided for wirelessly sharing electrical power over a wireless mesh network that comprises a plurality of electrical power-sharing hubs, including a first set of one or more neighboring electrical power-sharing hubs comprising at least a first electrical power-sharing hub, a second electrical power-sharing hub not within the first set, wherein the first set of one or more neighboring electrical power-sharing hubs are one wireless link away from the second electrical power-sharing hub, and a second set of one or more non-neighboring electrical power-sharing hubs that are more than one wireless link away from the second electrical power-sharing hub. Each of the plurality of electrical power-sharing hubs comprises one or more transmitters and one or more receivers to respectively transmit and receive wirelessly communications and electrical power, a hub-based power source or a connection to an external power source to power the first electrical power-sharing hub and electrical loads connectable thereto, and one or more controllers. The method comprises (a) receiving wirelessly, by the one or more receivers at the first electrical power-sharing hub from the second electrical power-sharing hub, a first request for a first amount of electrical power; (b) determining, by the one or more controllers at the first electrical power-sharing hub, whether electrical power is available at the first electrical power-sharing hub or at one or more other neighboring electrical power-sharing hubs in the first set that are one wireless link away in the wireless mesh network from the second electrical power-sharing hub to be shared with the second electrical power-sharing hub; (c) when electrical power is available at the first electrical power-sharing hub or at the one or more other neighboring electrical power-sharing hubs that are one wireless link away in the wireless mesh network from the second electrical power-sharing hub for sharing with the second electrical power-sharing hub and when the one or more controllers determine that the first electrical power-sharing hub is to provide the electrical power, transmitting wirelessly by the one or more transmitters a second amount of electrical power to the second electrical power-sharing hub; and (d) when the first amount of electrical power is not available at the first electrical power-sharing hub or at the one or more other neighboring electrical power-sharing hubs for sharing with the second electrical power-sharing hub, (i) transmitting wirelessly, by the first electrical power-sharing hub, a second request to the one or more electrical power-sharing hubs in the second set of one or more non-neighboring electrical power-sharing hubs to determine whether the one or more non-neighboring electrical power-sharing hubs in the second set has the first amount of electrical power or a portion thereof to share with the second electrical power-sharing hub; and (ii) receiving wirelessly, by the one or more receivers at the first electrical power-sharing hub from the one or more non-neighboring electrical power-sharing hubs in response to the second request, a third amount of electrical power when electrical power is available for sharing at the one or more non-neighboring electrical power-sharing hubs and transmitting wirelessly at least the third amount of electrical power that was received to the second electrical power-sharing hub. In embodiments, the method further comprises the step of (iii) triggering a third request for the first amount of electrical power or a portion thereof from a third set of one or more non-neighboring electrical power-sharing hubs that are not neighbors of the second electrical power-sharing hub when the first amount of electrical power or a portion thereof is not available from the first set or second set of electrical power-sharing hubs. In embodiments, the third request is to be transmitted by the first electrical power-sharing hub. In other exemplary embodiments, the third request is to be transmitted by at least one of the one or more neighboring electrical power-sharing hubs. In an exemplary embodiment, the second amount of electrical power comprises at least the first amount of electrical power that has been requested. In another exemplary embodiment, the second amount of electrical power comprises a portion of the first amount of electrical power that has been requested.

In another exemplary embodiment of the present invention, a system is provided for wirelessly sharing electrical power among one or more electrical power-sharing hubs in a wireless mesh network. The system comprises a first electrical power-sharing hub that includes one or more transmitters for transmitting communications and electrical power wirelessly to other electrical power-sharing hubs in the wireless mesh network, one or more receivers for receiving communications and electrical power wirelessly from other electrical power-sharing hubs in the wireless mesh network, a hub-based power source or a connector to an external power source to power the first electrical power-sharing hub and one or more electrical loads connectable to the first electrical power-sharing hub, and one or more controllers. The one or more controllers are configured to control the operation of the first electrical power-sharing hub to perform the following steps: (a) determining whether electrical power is to be requested by the first electrical power-sharing hub from one or more of the plurality of electrical power-sharing hubs other than the first electrical power-sharing hub in the wireless mesh network; (b) transmitting wirelessly, by the one or more transmitters, a first request to the first set of one or more neighboring electrical power-sharing hubs, which are one wireless link away in the wireless mesh network from the first electrical power-sharing, hub, to wirelessly obtain a first amount of electrical power from the one or more neighboring electrical power-sharing hubs in the first set; and (c) receiving, by the one or more receivers by wireless transmission from the one or more neighboring electrical power-sharing hubs in the first set to the first electrical power-sharing hub in response to the first request, a second amount of electrical power when the one or more of the neighboring electrical power-sharing hubs has electrical power to share with the first electrical power-sharing hub, in an exemplary embodiment, the second amount of electrical power comprises at least the first amount of electrical power that has been requested. In another exemplary embodiment, the second amount of electrical power comprises a portion of the first amount of electrical power that has been requested.

In embodiments, the one or more controllers are further configured to control the operation of the first electrical power-sharing hub to perform the step of obtaining by the first electrical power-sharing hub of the first amount of electrical power or a portion thereof from one or more non-neighboring electrical power-sharing hubs in the wireless mesh network by a relay of at least the first amount of electrical power or a portion thereof wirelessly from the one or more non-neighboring electrical power-sharing hubs with at least the first amount of electrical power or a portion thereof back to the first electrical power-sharing hi b via one or more of the plurality of electrical power-sharing hubs intermediate the one or more non-neighboring electrical power sharing hubs and the first electrical power-sharing hub.

In another exemplary embodiment of the present invention, a system is provided for wirelessly sharing electrical power among one or more electrical power-sharing hubs in a wireless mesh network. The system comprises a first electrical power-sharing hub including one or more transmitters for transmitting communications and electrical power wirelessly to other electrical power-sharing hubs in the wireless mesh network, one or more receivers for receiving communications and electrical power wirelessly from other electrical power-sharing hubs in the wireless mesh network, a hub-based power source or a connector to an external power source to power the first electrical power-sharing hub and one or more electrical loads connectable to the first electrical power-sharing hub, and one or more controllers. The one or more controllers are configured to control the operation of the first electrical power-sharing hub to perform the following steps: (a) receiving wirelessly by the one or more receivers at the first electrical power-sharing hub from the second electrical power-sharing hub, a first request for a first amount of electrical power; (b) determining, by the one or more controllers, whether electrical power is available at the first electrical power-sharing hub or at one or more other neighboring electrical power-sharing hubs that are one wireless link away in the wireless mesh network from the second electrical power-sharing hub to be shared with the second electrical power-sharing hub; (c) when electrical power is available at the first electrical power-sharing hub or at the one or more other neighboring electrical power-sharing hubs that are one wireless link away in the wireless mesh network from the second electrical power-sharing hub for sharing with the second electrical power-sharing hub and when the one or more controllers determine that the first electrical power-sharing hub is to provide the electrical power, transmitting wirelessly by the one or more transmitters a second amount of electrical power to the second electrical power-sharing hub; (d) when the first amount of electrical power is not available at the first electrical power-sharing hub or at the one or more other neighboring electrical power-sharing hubs for sharing with the second electrical power-sharing hub, (i) transmitting wirelessly, by the one or more transmitters at the first electrical power-sharing hub, a second request to a first set of one or more non-neighboring electrical power-sharing hubs that are two wireless links away in the wireless mesh network from the second electrical power-sharing hub, to determine whether the one or more non-neighboring electrical power-sharing hubs has the first amount of electrical power or a portion thereof to share with the second electrical power-sharing hub; and (ii) receiving, by the one or more receivers, a third amount of electrical power when available wirelessly from the one or more non-neighboring electrical power-sharing hubs and transmitting wirelessly the received electrical power to the second electrical power-sharing hub. In embodiments, the one or more controllers of the first electrical power-sharing hub may be configured to further perform the step of (in) transmitting a third request to request the first amount of electrical power or a portion thereof from one or more non-neighboring electrical power-sharing hubs that are at least three wireless links away from the second electrical power-sharing hub when the first amount of electrical power or a portion thereof is not available from the one or more neighboring electrical power-sharing hubs or from the one or more non-neighboring electrical power-sharing hubs that are two wireless links away from the second electrical power-sharing hub. In an exemplary embodiment, the second amount or the third amount of electrical power comprises at least the first amount of electrical power that has been requested. In another exemplary embodiment, the second amount or the third amount of electrical power comprises a portion of the first amount of electrical power that has been requested.

BRIEF DESCRIPTION OF THE DRAWINGS

Exemplary embodiments of the present invention will be described with references to the accompanying figures, wherein.

DETAILED DESCRIPTION

Figure 1:
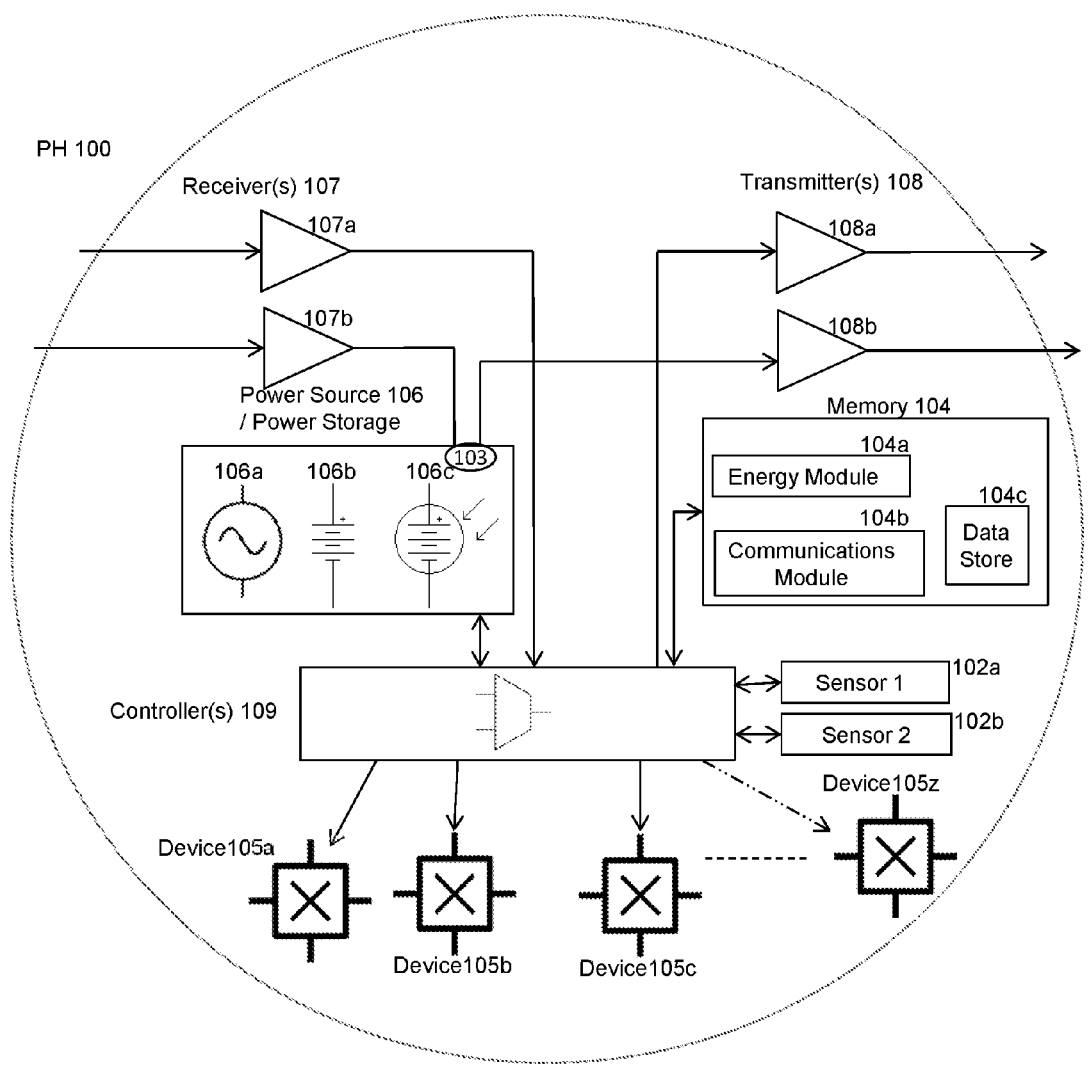
FIG. 1 is a diagram showing components of a exemplary electrical power-sharing hub that is configured to operate within a wireless mesh network in accordance with an embodiment of the present invention.

A system and method in accordance with the present invention provides for sharing of electrical power wirelessly between electrical power-sharing hubs that are linked together as a wireless mesh network for wireless communications and power sharing so as to provide a "Wireless Power Sharing Network." In embodiments, electrical power may also be shared between electrical power-sharing hubs in different wireless mesh networks. A wireless mesh network (WMN) is a network of interconnected nodes that communicate wirelessly. In a wireless mesh network, data is transmitted by a source node and is routed wirelessly through the wireless mesh network from node to node until the destination node is reached. In the present invention, electrical power may also be similarly shared by wirelessly relaying the power from node to node. The nodes of the wireless mesh network of the present invention are electrical power-sharing hubs that provide power to electrical loads, such as devices, that are connected to the hubs. These electrical power-sharing hubs may vary in scale, such that smaller hubs may power devices such as cell phones or computers while larger scale hubs in accordance with the present invention may power larger loads, such as heavy machinery or factory equipment. The electrical power-sharing hubs in accordance with the present invention may be in a fixed location or may be mobile.

To power the various electrical loads, such as devices, connected to the electrical power-sharing hub, the electrical power-sharing hub needs an adequate supply of electrical power. Each electrical power-sharing hub therefore generates its own electrical power with a hub-based power source (e.g. using solar power, gas, or other fuel) and/or is actively powered by a connection to an external power source (e.g., by connecting the hub to an external power supply, such as an electrical outlet). However, when it has insufficient electrical power, an electrical power-sharing hub may need to obtain power wirelessly from one or more other electrical power-sharing hubs in the wireless mesh network that have extra electrical power beyond the amount of electrical power that is needed locally at the one or more other electrical power-sharing hubs. An electrical power-sharing hub may have insufficient power, for example, when the hub-based power source and/or the external power source become inadequate or when the hub must power an unusually heavy electrical load that the hub cannot support. The hub-based power source may be inadequate, for example, due to an equipment failure or a darkening of the sky that interrupts a solar power supply, while the external power source may, for example, suffer a power outage. In such situations, the electrical power-sharing hub may only be able to provide limited battery power to the transmitter, receiver and controller for communications, including communications to request power wirelessly for a limited time, but is generally not able to power other electrical loads, including connected devices, unless power can be obtained wirelessly. (If power is exhausted at the hub before additional power is obtained wirelessly, the electrical power-sharing hub may be restarted, manually or automatically, such as when power supplied by a wired connection is restored.)

FIG. 1 illustrates an exemplary embodiment of an electrical power-sharing hub PH 100 in accordance with the present invention that powers devices 105 (e.g., 105a, 105b, 105c and 105z), and other electrical loads. As shown in FIG. 1, electrical power-sharing hub PH 100 includes one or more receivers 107 (107a, 107b) and transmitters 108 (108a, 108b), one or more controllers/processors 109, and one or more sensors 102 (e.g., 102a, 102b). Each electrical power-sharing hub may be powered by one or more power sources 106 (e.g., 106a, 106b, 106c) at the hub or by connections to an external power source. The power source 106 of an electrical power-sharing hub, which powers the receivers 107, transmitters 108, one or more controllers (processors) 109, sensors 102 as well as the devices 105, may provide one or more of alternating current 106a, direct current from a battery 106b (which may or may not be rechargeable), and/or current from a solar cell 106c. Depending on the battery capacity, the battery 106b may be sufficient for operating the hub until power returns or may only have sufficient power to serve as backup power for basic hub operations (i.e., not the powering of devices 105) to be maintained during an outage and for communications to be maintained with other hubs to enable a request to be sent for electrical power to be sent wirelessly. When there is a power outage at the hub and no available battery power, some small amount of electrical power to resume hub communications may be provided where controller 109 has a battery-less mode in which it can be energized, either automatically or manually (such as with an inductive coil in a proximity key) and thereafter electrical power may be obtained wirelessly.

Depending on the amount of power to be stored and the capacity of the battery, battery 106b, when rechargeable, may be used for storage of electrical power that is received wirelessly by electrical power-sharing hub PH 100. During recharging, battery 106b may also be considered one of the devices 105 that provides an electrical load to hub PH 100. Alternatively, the electrical power that is received wirelessly at hub PH 100 may be stored in a separate battery (different from battery 106b) or an energy storage device at or associated with hub PH 100, such as storage device that uses compressed air energy storage, flywheels, or electrochemical supercapacitors, to name a few. As an alternative to storing power that is received wirelessly, the received power may be used at the electrical power-sharing hub PH 100 as it is received in quasi real-time.

The one or more receivers 107 may include a first receiver for wirelessly receiving both data communications and electrical power at the electrical power-sharing hub PH 100 or may include separate receivers (107a, 107b) for wirelessly receiving communications and electrical power from another electrical power-sharing hub. The one or more transmitters 108 may include a first transmitter for wirelessly transmitting communications and electrical power, such as where, for example, Wi-Fi technology is used, or separate transmitters (108a, 108b) for wireless communications and electrical power and can transmit electrical power to another electrical power-sharing hub wirelessly. In an alternate embodiment, rather than having separate transmitters and receivers, one or more transceivers (a combined transmitter and receiver) may be used for wireless communications and/or wireless power transfer. One example of a transmitter and receiver that may be used for both communications and for wirelessly sharing electrical power is a microwave antenna or a transmitter and receiver on a wireless device that is WiFi-enabled.

In the embodiment shown in FIG. 1, electrical power-sharing hub PH 100 further includes non-transitory computer-readable memory 104, for example, external and/or internal hard drives (e.g., PC memory card, flash memory), disk drives, and/or other removable memory such as SD cards, memory cards, flash memory cards, and/or flash memory sticks, data stored in one or more databases in the non-transitory computer-readable memory, and/or one or more software modules stored in the non-transitory computer-readable memory and running or configured to run on the one or more controllers 109. Memory 104 may include a data store 104c for storing data related to the operations of the hub PH 100, such as records relating to hub operators whose hubs received or transmitted electrical power wirelessly, the time and date of each occurrence, and how much power was obtained or shared wirelessly.

Instructions for one or more controllers 109 may be stored on the non-transitory computer-readable memory 104 as one or more modules. For example, an Energy Module 104a may include instructions for monitoring power requirements of the electrical power-sharing hub PH 100, obtaining additional electrical power wirelessly from another electrical power-sharing hub or transmitting power to another electrical power-sharing hub when the present hub has extra power that it can share. A Wireless Communications Module 104b contains instructions for communicating with other hubs in the wireless mesh network using one or more wireless communications protocols.

One or more controllers 109 are associated with the non-transitory computer-readable memory 104 and control the electrical power-sharing hub PH 100, using the instructions stored in memory 104. In an alternative embodiment of the present invention, controller 109 may be an application specific integrated circuit (ASIC) chip that is configured to perform the wireless sharing of electrical power and communications with the other electrical power-sharing hubs in the wireless mesh network. In the latter case, operating instructions may be stored at the controller 109 and need not be stored as modules 104a, 104b in memory 104.

Electrical power-sharing hub PH 100 may further include one or more sensors 102a, 102b such as sensors for detecting conditions relevant to the operation of the electrical power-sharing hub PH 100. For example, a light sensor may be used to detect whether there is sun to power a solar-powered electrical power-sharing hub PH 100, a temperature sensor may be used to detect the ambient temperature, or an acoustic sensor may be used to detect vibrations from earthquakes.

Electrical power-sharing hub PH 100 may further include one or more electric meters 103 (such as an electronic meter) to measure the amount of available electrical power at the hub, or to track the amount of electrical power that is transmitted or received by the electrical power-sharing hub.

The electrical loads placed on electrical power-sharing hub PH 100 may vary depending on the capacity of the hub. For example, an electrical power-sharing hub PH 100 may provide power on the order of a few watts (e.g., 1-5 watts), hundreds of watts, thousands of watts (kilowatts), or megawatts. Some non-limiting examples of devices 105 that may be powered by an electrical power-sharing hub PH 100 providing hundreds or thousands of watts are consumer devices, such as a smartphone, a tablet computer, a laptop computer, a desktop computer, a wearable computer, a cell phone, personal data assistant, or a specially-configured terminal, to name a few, and sensors 102. Where electrical power-sharing hub PH 100 has a much larger, industrial-grade power source to supply power on the order of megawatts, the electrical loads/devices powered by the hub may be, for example, large pieces of equipment or even power distribution stations. Devices 105 to be powered by the hub may also include input devices (e.g., keyboards, mice, touch screens, microphones, cameras) and/or output devices (e.g., display devices, speakers), including input and output devices that may be used to interact with electrical power-sharing hub PH 100, as necessary.

In addition to the wireless power transfer connections, an electrical power-sharing hub PH 100 may also be connected to share power with a conventional electrical grid. In this case, the electrical power transfers may be performed in a hybrid manner both over a conventional wired electrical grid and wirelessly over the wireless mesh network 10.

Figure 2:
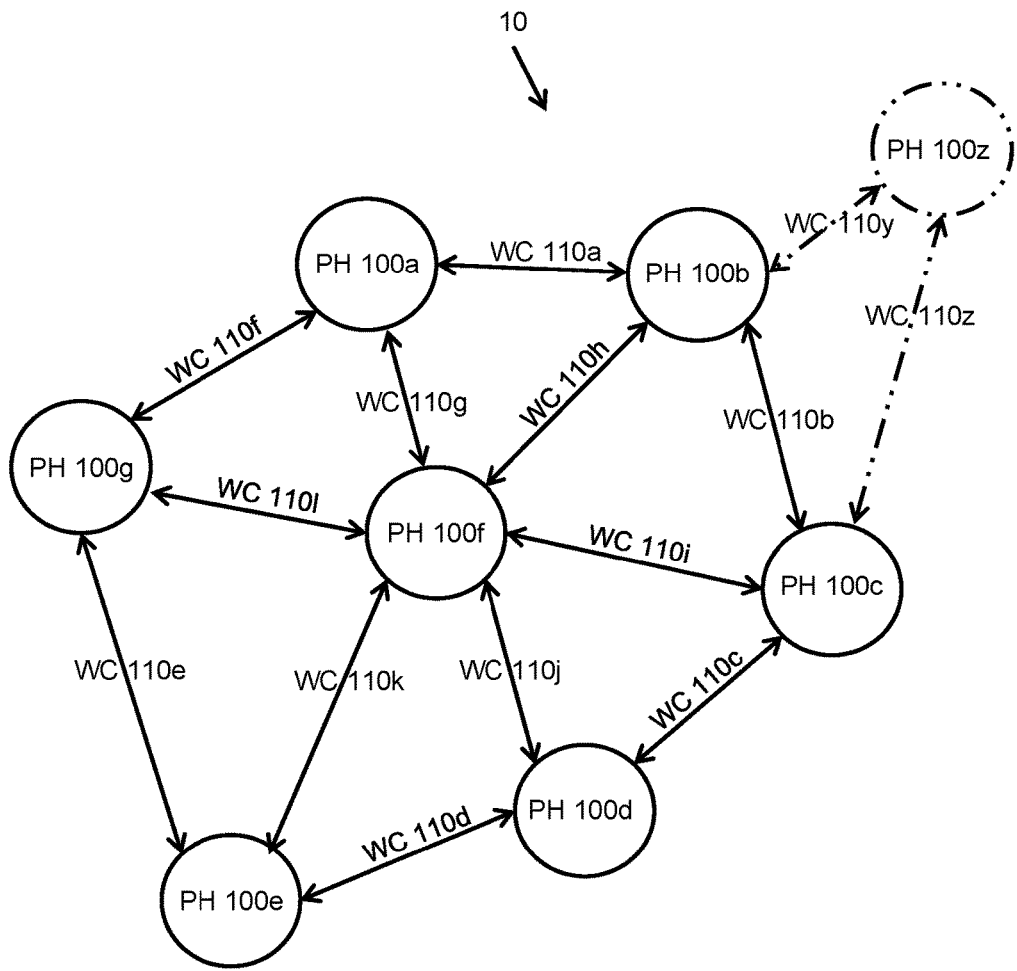
FIG. 2 is an overview of an exemplary topology of a wireless mesh network that includes the electrical power-sharing hub of FIG. 1 in accordance with an embodiment of the present invention.

FIG. 2 shows an example of a wireless mesh network 10 in accordance with an embodiment of the present invention. Network 10 includes multiple electrical power-sharing hubs PH 100 (such as illustrated hubs PH 100*a*-PH 100*g* and PH 100*z*) and wireless communications links ("wireless links") WC 110 (including WC 110*a*-110*l* and 110*y*, 110*z*) that represent wireless connections for energy transfer and data communications between the electrical power-sharing hubs. Wireless mesh network 10 may also include nodes that are only configured for data communications.

In one exemplary embodiment, each electrical power-sharing hub PH 100 in wireless mesh network 10 may be operated by a different entity/service provider. In another exemplary embodiment, more than one of the electrical power-sharing hubs PH 100 in wireless mesh network 10 may be operated by the same entity/service provider. In yet another exemplary embodiment, all of the electrical power-sharing hubs PH 100 in wireless mesh network 10 may be operated by the same entity/service provider.

In the present invention, any wireless communications protocol for wireless mesh networks can be used to communicate data among the electrical power-sharing hubs. Wireless connections may include Wi-Fi, ZigBee, Bluetooth, Bluetooth Low Energy, radio, satellite, infrared connections, communication protocols, to name a few, or cellular or cellular data connections and protocols (e.g., digital cellular, PCS, CDPD, GPRS, EDGE, CDMA2000, 1×RTT, Ev-DO, HSPA, UMTS, 3G, 4G, 5G, and/or LTE, to name a few).

Wireless power transfer technologies enable the electrical power-sharing hubs to also wirelessly share electrical power bidirectionally, as needed, across the wireless mesh network. As noted above, the wireless sharing of electrical power may be achieved by incorporating into the electrical power-sharing hubs PH 100 or connecting the hubs PH 100 to any wireless power transfer technology that transmits power over the physical distance between electrical power-sharing hubs in the wireless mesh network. Some suitable wireless power transfer technologies for use with the present invention include, for example, Wi-Fi, a standard RF signal, microwave, acoustic, laser, capacitive coupling, induction, and magnetic resonance technologies, to name a few. A satellite, for example, may transmit power with a microwave transmission at 90% efficiency from a source directly to a destination thousands of kilometers away using a large power supply in the Gigawatt range. The energy sent by the microwave transmission may be received by parabolic dishes, phased arrays, or rectannas (rectifying antennas) and converted into electrical energy at one of the receivers 107*a*, 107*b*.

Microwave technology may also be used for short range wireless power transfer to provide up to several megawatts of power. For example, a product line WattUp® from Energous Corporation of San Jose, Calif. USA, offers a separate WattUp® transmitter and Wattup® receiver that transmits power from the transmitter to the receiver. Such technology is said to capable of wirelessly delivering 1-4 watts of power to wirelessly charge wireless devices that are located within the 15 foot radius of the transmitter.

Power can also be wirelessly transmitted, for example, from transmitter to a receiver using an infrared light beam or acoustic technology. E.g., Wi-Charge Ltd. of Rehovot, Israel (infrared light transmission transmits power wirelessly up to approximately 30 feet) and uBeam Inc. of Santa Monica, Calif. (acoustic technology—ultrasound power transmission).

Power can also be wirelessly transmitted and received, for example, by use of a Cota® Transmitter and Cota® Receiver from Ossia Inc. of Bellevue, Wash. USA (using RF radio signals), or a PowerCast TX91501 Transmitter and a separate P2110 Receiver from Powercast® Corporation of Pittsburgh, Pa. USA (using microwave technology).

Because different wireless power transfer technologies have different maximum physical distances over which power can be transferred, distances between adjacent electrical power-sharing hubs in the wireless mesh network may be tracked, such as by providing a GPS (Global Positioning System) tracking device at each electrical power-sharing hub PH 100. The tracking information may be used in predicting potential power losses during transmission or whether the wireless electrical power transfer is viable in view of the wireless power sharing technologies in use in the wireless mesh network. Such information may be especially important where a hub PH 100 is mobile.

Figure 3A:
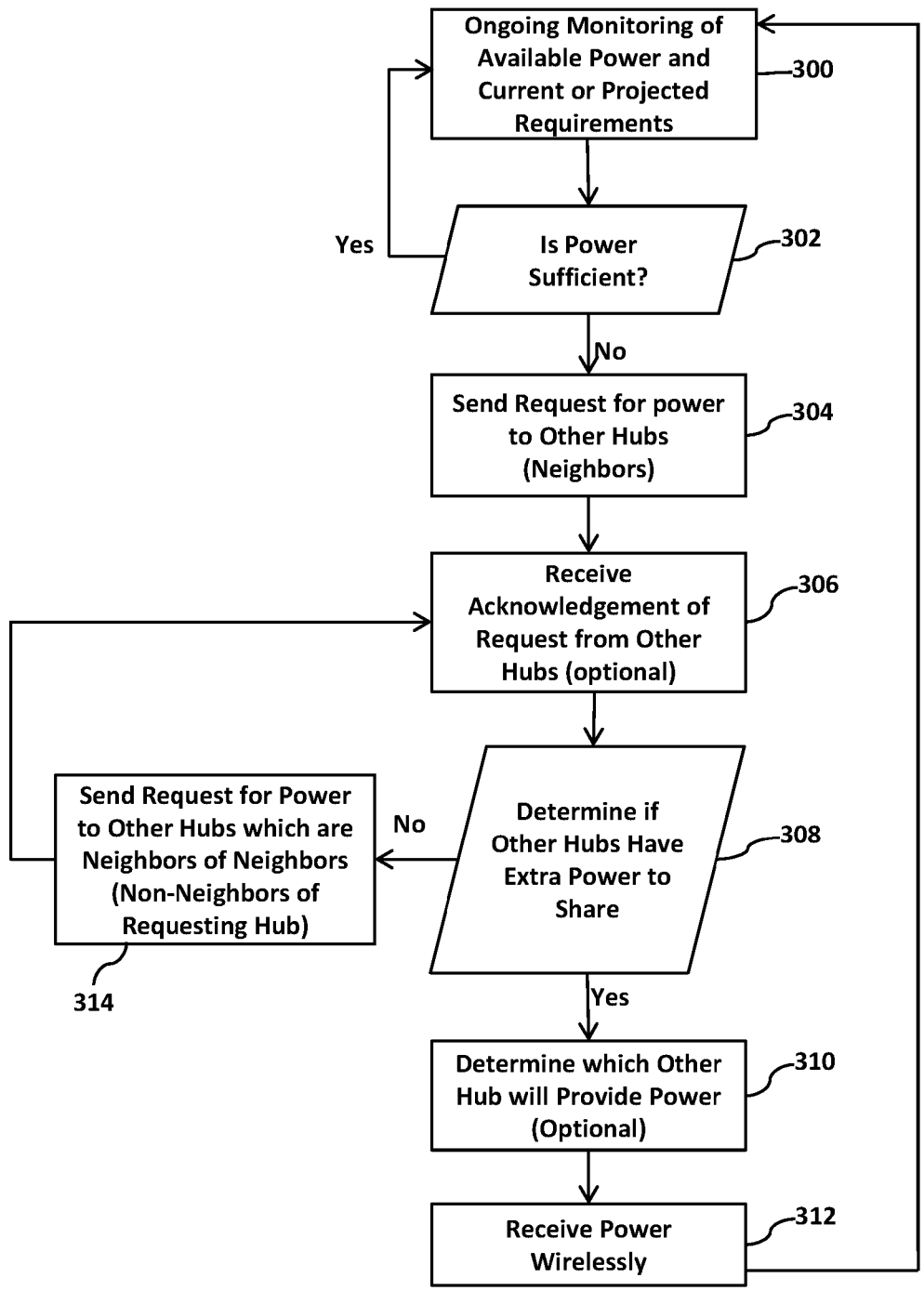
FIG. 3A is a flow chart of an exemplary algorithm to be performed by an electrical power-sharing hub that requests electrical power to be shared wirelessly in accordance with an embodiment of the present invention.

FIG. 3A is a flow chart of an algorithm that controller 109 is configured to perform, in an exemplary embodiment of the present invention, after power up, to control the operation of the first electrical power-sharing hub to monitor electrical power needs at any of the electrical power-sharing hubs PH 100 (e.g., PH 100*g*) and share (i.e., transmitting or receiving) electrical power with other electrical power-sharing hubs PH 100 (e.g., PH 100*a* to 100*f* and PH 100*h* to 100*z*). This algorithm, which is explained further below with reference to the examples shown FIGS. 4A to 4G and 5A to 5K. In all of these figures, wireless communications are handled by one or more of receivers 107 and transmitters 108 at each electrical power-sharing hub PH 100, and wireless power transfer is handled by one or more of receivers 107 and transmitters 108 that are provided for wireless power transfer. As noted above, with certain technologies, the same receiver 107 and the same transmitter 108 may be used for both communications and wireless power transfer.

In the algorithm of FIG. 3A, controller 109 monitors on an ongoing basis the available power at an electrical power-sharing hub PH 100 and the current and/or projected power requirements of that hub to power electrical loads or devices 105 connected thereto (step 300). At step 302, a determination is made as to whether the available electrical power at the current electrical power-sharing hub is sufficient or whether additional power is needed. This determination may be made by a comparison of the electrical power, if any, that is currently available at electrical power-sharing hub PH 100 and an actual or projected need for electrical power to power electrical loads or devices 105. (A projected need may be based on, for example, the typical power load placed on the hub at a particular time of day.)

Next, if additional electrical power is needed by the first electrical power-sharing hub, controller 109 causes the transmission of a request for a specified amount of power to be sent to other electrical power-sharing hubs in the wireless mesh network 10, at step 304, to determine whether one or more of the electrical power-sharing hubs in the wireless mesh network has extra electrical power that it can share by wireless transmission. The request for power may indicate how much electrical power is requested. The maximum amount of power that is requested may be limited by the amount of energy storage that is available at the requesting electrical power-sharing hub if the power is not used as received on a quasi real-time basis.

In an exemplary embodiment, the request for power is initially sent by controller 109 to a first set of neighboring electrical power-sharing hubs that includes all neighboring electrical power-sharing hubs that are one wireless link away from the electrical power-sharing hub that requires power. In an alternative embodiment, the request may be sent to a first set of neighboring electrical power-sharing hubs that is a subset of all neighboring electrical power-sharing hubs and may be sent to another set of neighboring electrical power-sharing hubs if the first set of neighboring electrical power-sharing hubs does not have extra electrical power.

At step 306, the requesting electrical power-sharing hub may, in embodiments, be configured to receive acknowledgements of the request from the other neighboring electrical power-sharing hubs to ensure receipt of the request. If acknowledgements are expected and not received, the request for the sharing of electrical power may be repeated. At step 308, the neighboring electrical power-sharing hubs from which power has been requested determine whether any of them have electrical power that can be shared. Optionally, the requesting electrical power-sharing hub may also be provided with information as to which other electrical power-sharing hubs have electrical power to spare.

At step 310, the one or more controllers 109 of respective neighboring electrical power-sharing hubs automatically determine among themselves which of them will provide the requested electrical power (based on factors such as which electrical power-sharing hub has spare power; this may depend on whether the neighboring electrical power-sharing hub is already supplying power to another electrical power-sharing hub). Alternatively, if multiple neighboring electrical power-sharing hubs have available electrical power, the requesting electrical power-sharing hub may determine which neighboring electrical power-sharing hub will provide the power. For example, a particular service provider may prefer that a particular one of the neighboring electrical power-sharing hubs provide the power. Preferably, a single neighboring electrical power-sharing hub will be able to provide the entire amount of electrical power that is needed by the first electrical power-sharing hub. However, if that amount of electrical power is not available, at least a portion of the requested power may be transmitted. Thereafter, at step 312, the requesting electrical power-sharing hub receives the requested power that is transmitted wirelessly by its neighboring electrical power-sharing hub.

To account for power losses that are inevitable in wireless transmission, the amount of electrical power that is requested by the first electrical power-sharing hub may be larger than the amount of power actually needed so that sufficient power will be received. Alternatively, an electrical power-sharing hub that supplies electrical power in response to receiving a request for electrical power may send additional power beyond the amount of power requested to compensate for the power losses. Thus, the electrical power-sharing hub that wirelessly transmits additional electrical power may transmit at least the requested amount of power or a portion thereof. If the electrical power that is wirelessly transmitted does not account for losses, the amount of electrical power received by the requesting hub is likely to only be a portion of the amount of electrical power that was requested.

If it is expected that only a portion of the requested electrical power is available to be shared by a particular hub, it may not be useful to try to obtain the electrical power from that hub unless the "portion thereof" meets or exceeds a threshold amount of electrical power. For example, if 10 Watts is requested but another hub can only spare 5 Watts, it may not be practical to transmit only the 5 Watts if 5 Watts is expected to be lost during wireless transmission. Thus, in this example, the threshold amount of electrical power may be, for example, 7 to 8 Watts so as to limit wireless transmissions of electrical power to those transmissions where an electrical power-sharing hub will receive an amount of electrical power that will be meaningful to it. The value of the threshold amount of electrical power may be stored at the electrical power-sharing hub PH 100 and may be transmitted along with a request by the hub for electrical power.

If it is determined, at step 308, that the neighboring electrical power-sharing hubs from which electrical power was requested do not have extra electrical power to share, electrical power may be requested, at step 314, from all or a subset of all of the neighbors of the neighboring electrical power-sharing hubs, which constitute a set of "non-neighboring electrical power-sharing hubs" of the requesting hub that requires additional electrical power. This request for electrical power that is transmitted to non-neighboring electrical power-sharing hubs may be in the form of a second request sent from the requesting electrical power-sharing hub via the neighboring electrical power-sharing hubs (if the requesting electrical power-sharing hub has access to a database or map in which the network topology is recorded so that these neighbors of neighbors are known). Alternatively, the request for electrical power may be transmitted automatically by one of more of the neighboring electrical power-sharing hubs when the neighboring electrical power-sharing hubs do not have power to share. In the latter case, the request is triggered by the first request from the requesting electrical power-sharing hub and the lack of electrical power found at the neighboring electrical power-sharing hubs.

Where electrical power is requested from the non-neighboring electrical power-sharing hubs, the algorithm will return to step 306 (if acknowledgements are used, and otherwise returns to step 308) and may continue to be performed. If the non-neighboring electrical power-sharing hubs do not have electrical power to share, requests may be passed along to another set of one or more electrical power-sharing hubs that are one additional wireless link away. This relay of requests from hub to hub in an iterative process may continue until extra electrical power that can be shared wirelessly with the requesting electrical power-sharing hub is located within wireless mesh network 10. However, given power losses during wireless power transmission, it may not be efficient to request power from hubs past a certain point. Thus, the attempts to obtain electrical power from other electrical power-sharing hubs may automatically terminate, at least temporarily, if power is not found beyond a certain distance or a certain number of links away from the requesting electrical power-sharing hub. At that point, the algorithm returns to step 300 for ongoing monitoring. Another attempt may be made at a later time (e.g., after a 15 or 30 minute delay), to obtain power for the electrical power-sharing hub that was unable to obtain electrical power from other electrical power-sharing hubs.

An additional way to compensate for power losses resulting from wireless transmission from a source hub that is more than one wireless link away from a destination hub that requests electrical power is to request or pre-arrange that one or more intermediate hubs between the source and destination amplify the power received before retransmitting it to the next hub by providing an extra amount of electrical power to compensate for at least some of the transmission loss. For example, if a source at a non-neighboring hub sends 10 Watts, and 5 Watts are lost during transmission from the non-neighboring hub to an intermediate hub one wireless link away, the intermediate hub may be able to boost the power back up by 5 Watts to a total of 10 Watts to compensate for the 5 Watts that had been previously lost during transmission.

Figure 3B:
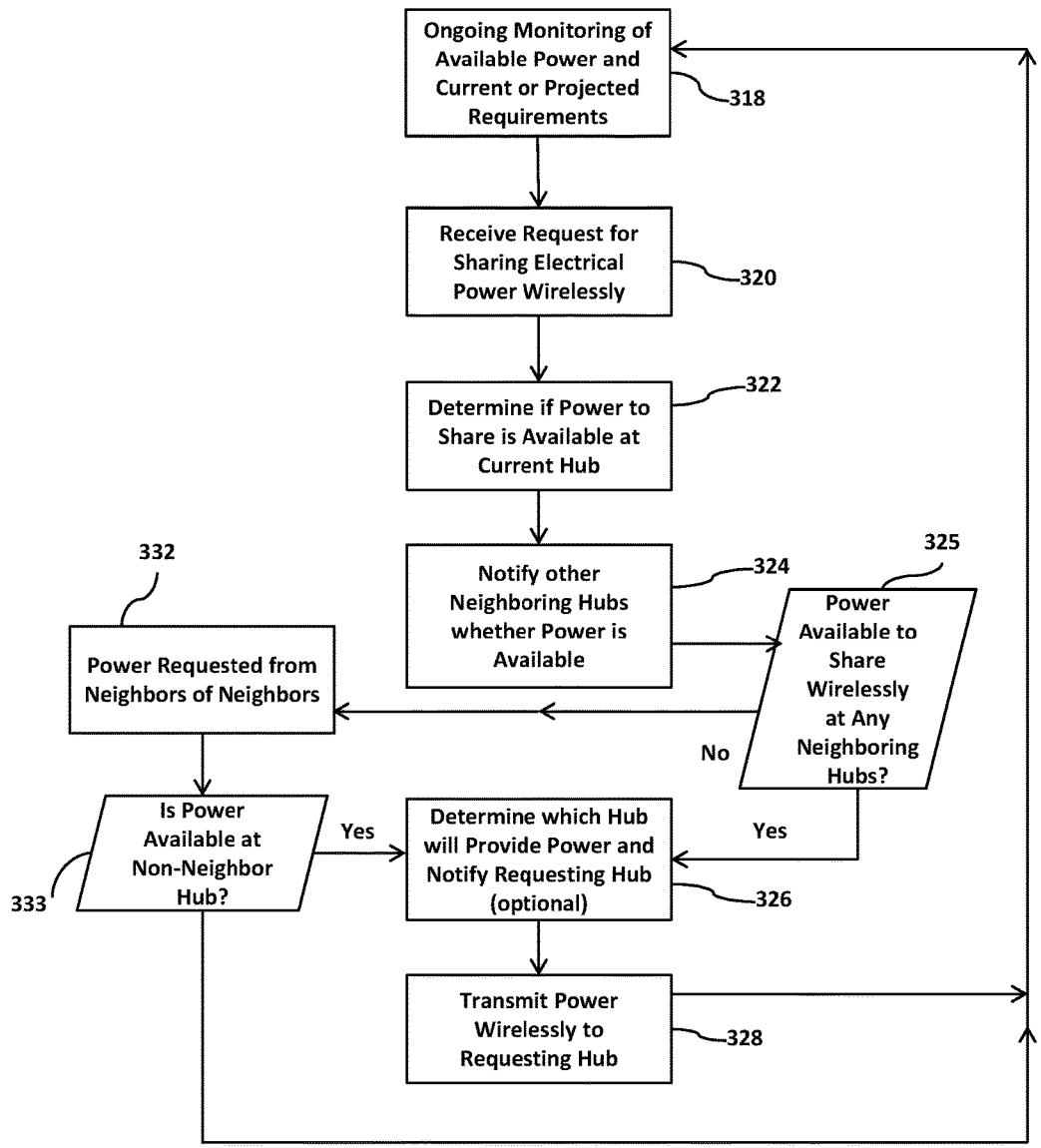
FIG. 3B is a flow chart of an exemplary algorithm to be performed by an electrical power-sharing hub that receives a request from another electrical power-sharing hub to transmit electrical power wirelessly in accordance with an embodiment of the present invention.

FIG. 3B is a flow chart that illustrates the algorithm performed at an electrical power-sharing hub upon receiving a request for electrical power from another electrical power-sharing hub that initially requests the electrical power. For example, with reference to FIG. 2, hub PH 100a that is a neighbor to the electrical power-sharing hub PH 100g may request electrical power using the algorithm of FIG. 3A. Each hub PH 100 in wireless mesh network that performs wireless power transfer may be configured to perform both the algorithms of FIGS. 3A and 3B as a respective electrical power-sharing hub may be a hub in need of power and may also receive a request to share electrical power. This algorithm is further understood with reference to FIGS. 4A to 4G and 5A to 5K described below.

In the algorithm of FIG. 3B, one or more controllers 109 at an electrical power-sharing hub monitors, on an ongoing basis, the available power at electrical power-sharing hub and the current and/or projected power requirements of the hub PH 100 to power electrical loads or devices 105 connected thereto (step 318). At step 320, the electrical power-sharing hub receives a request from another electrical power-sharing hub to wirelessly share electrical power. Next, at step 322, the electrical power-sharing hub determines whether it has electrical power that it can share. At step 324, the electrical power-sharing hub also communicates with any other neighboring electrical power-sharing hubs (i.e., neighbors of the power-requesting electrical power-sharing hub) to which the power-requesting electrical power-sharing hub sent a request for power. At step 325, the other neighboring electrical power-sharing hubs determine whether they have power to share. If there is power to share at any of the neighboring electrical power-sharing hubs, at step 326, the second electrical power-sharing hub and the other neighboring electrical power-sharing hubs determine which, if any, hub(s) will provide electrical power to the power-requesting electrical power-sharing hub, and at least one of them notifies the present electrical power-sharing hub that power will be transmitted. The notification may specify how much electrical power will be sent, and which electrical power-sharing hub will send the power, among other things. At step 328, when the electrical power-sharing hub is to transmit power, electrical power is transmitted wirelessly to the power-requesting electrical power-sharing hub and the algorithm then ends at step 330.

If there is no power available for sharing at any of the neighboring electrical power-sharing hubs, at step 332, the electrical power-sharing hub performing this algorithm may transmit a request for electrical power on behalf of the power-requesting electrical power-sharing hub to one or more of its non-neighboring electrical power-sharing hubs (i.e., non-neighbors of the first electrical power-sharing hub that requested the power). If it is determined at step 333 that at least one of the non-neighboring hubs has electrical power to share, then at step 326 the electrical power-sharing hub is notified by at least one of its neighboring electrical power-sharing hubs, that the electrical power will be provided and, at step 328, the electrical power is relayed to the first electrical power-sharing hub via the second electrical power-sharing hub or one of the other hubs that neighbors the first hub. The algorithm of FIG. 3B then returns to step 318. The algorithm of FIG. 3B also returns to step 318 when no electrical power is available to be shared with the power-requesting electrical power-sharing hub from any non-neighboring electrical power-sharing hub. The amount of electrical power that is used by or is transmitted or received by each electrical power-sharing hub in the algorithms of FIGS. 3A and 3B may be tracked with electric meter 103. This algorithm may also be implemented such that acknowledgements may be requested or required in response to transmissions between nodes.

Figure 4A:
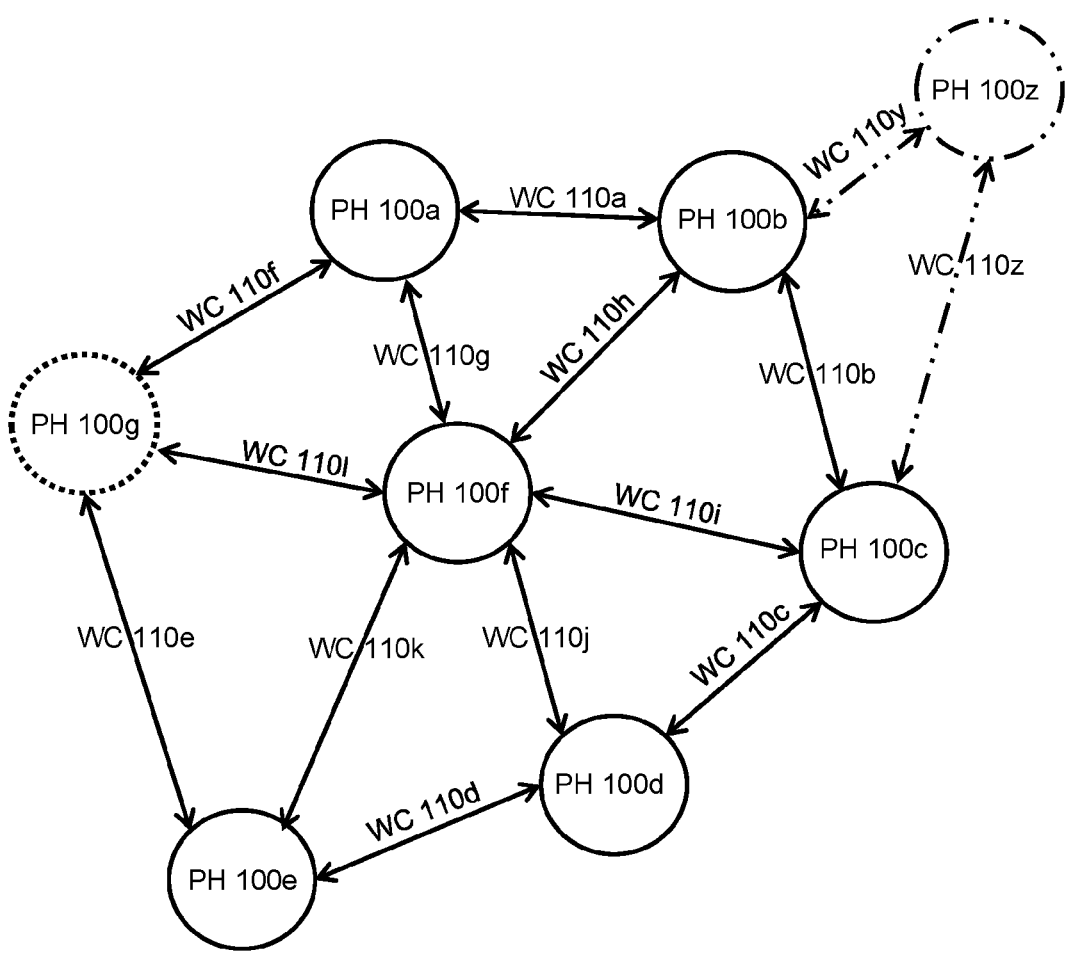
FIGS. 4A-4G illustrate an implementation of the algorithms in accordance with the present invention as performed in a wireless mesh network topology where one electrical power-sharing hub seeks to obtain additional electrical power wirelessly from another electrical power-sharing hub in the network in accordance with an embodiment of the present invention.
Figure 4B:
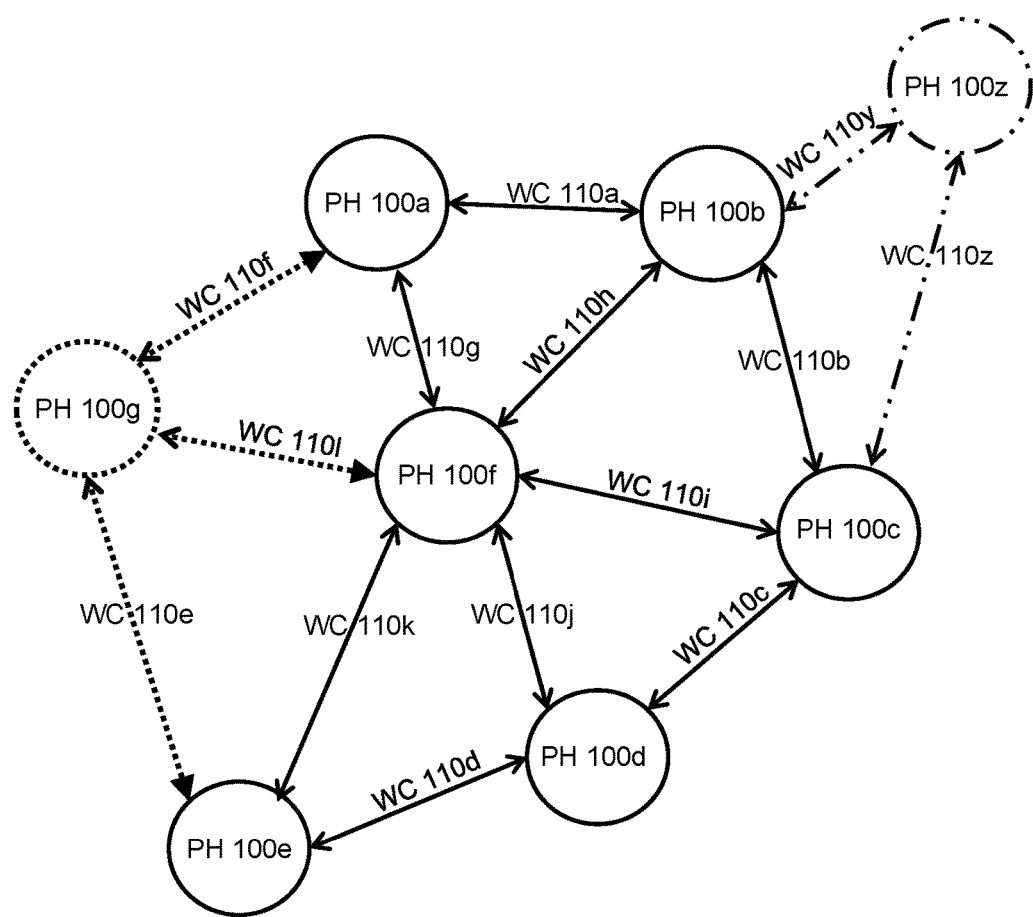
Figure 4C:
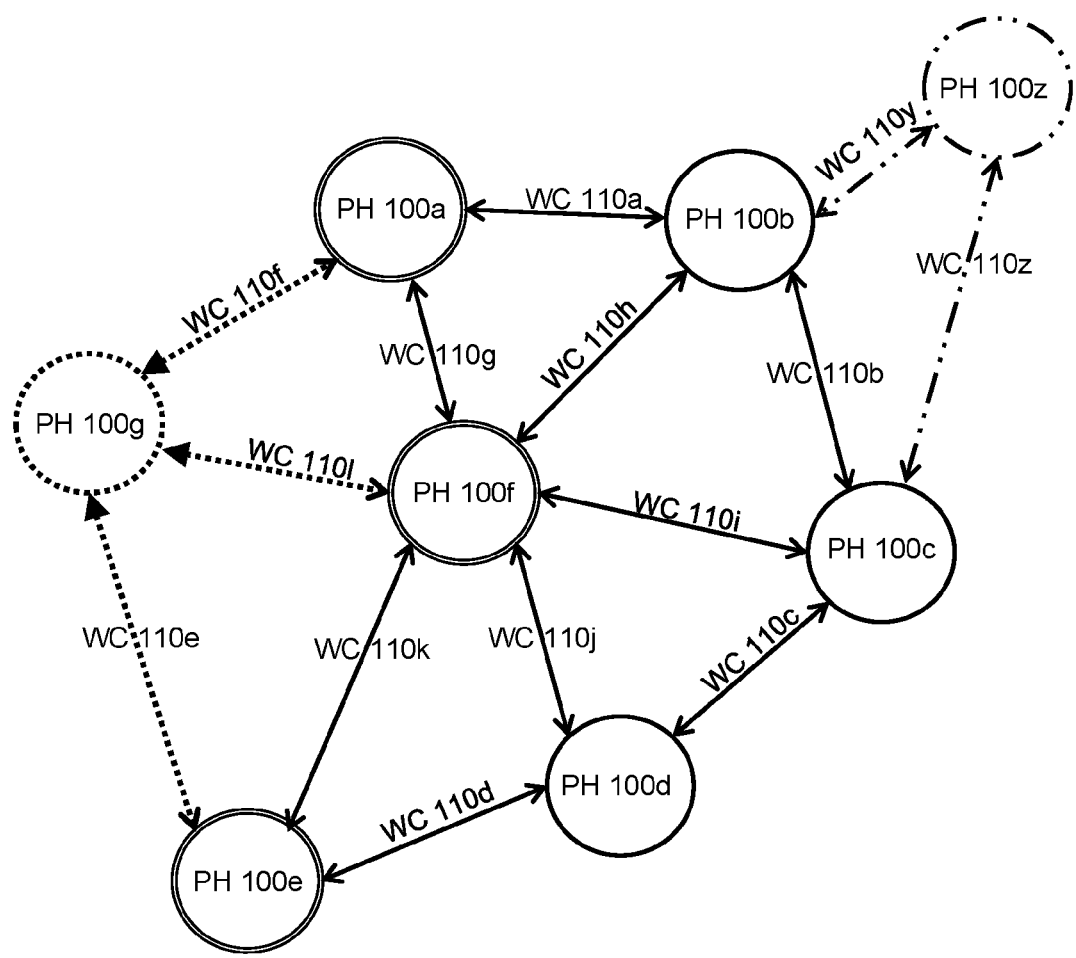
Figure 4D:
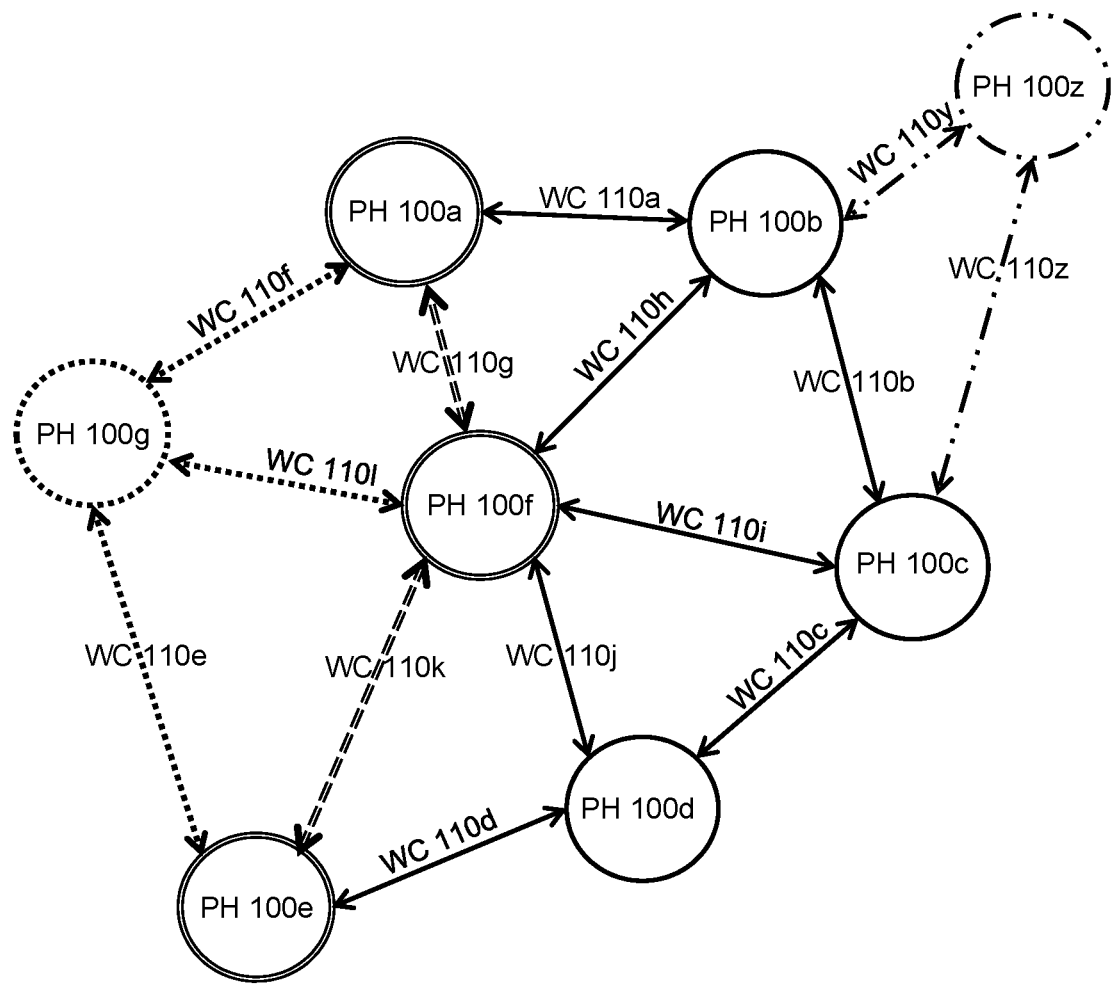
Figure 4E:
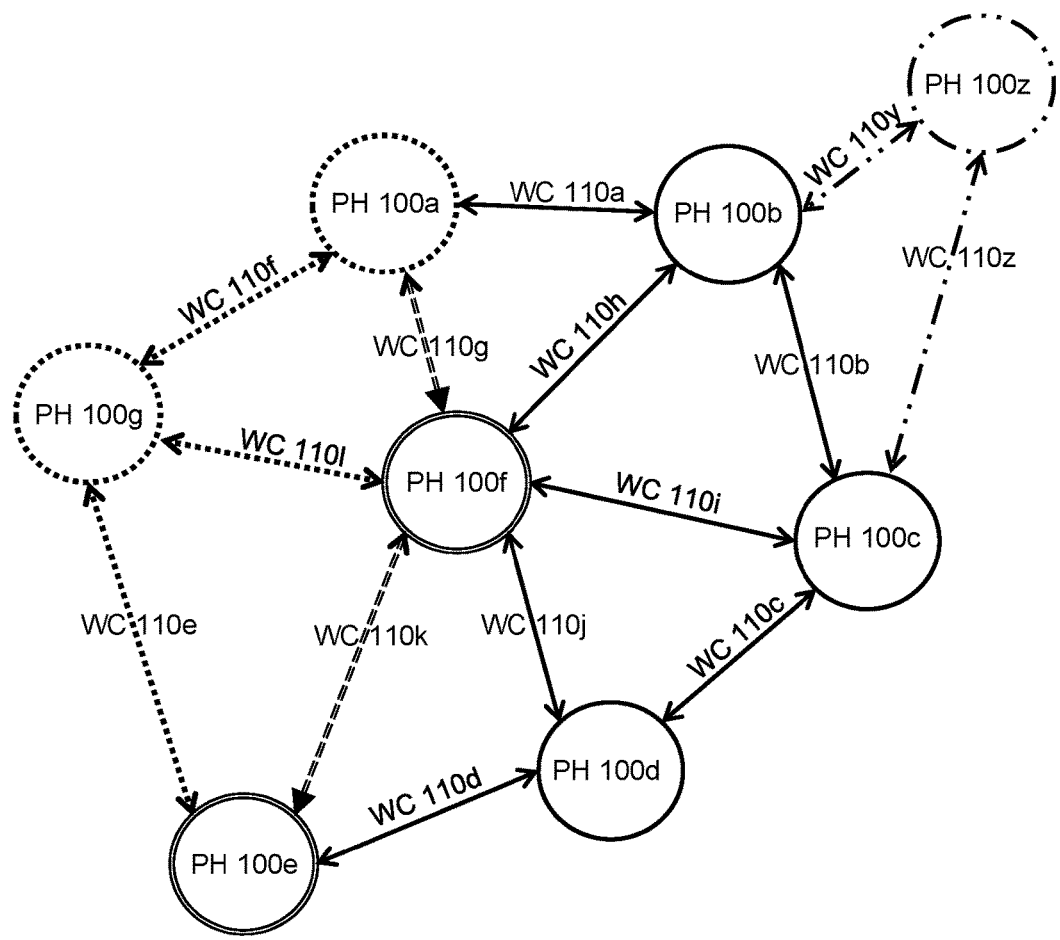
Figure 4F:
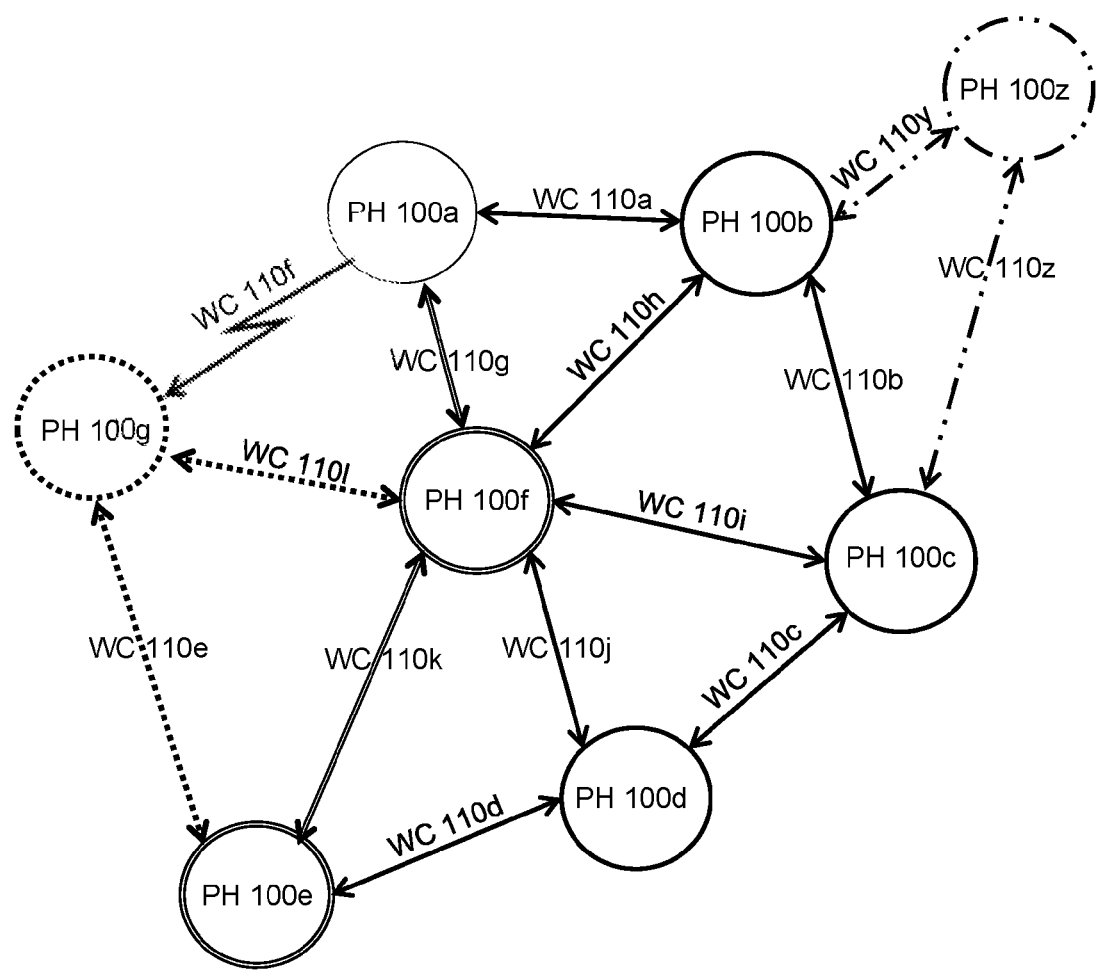
Figure 4G:
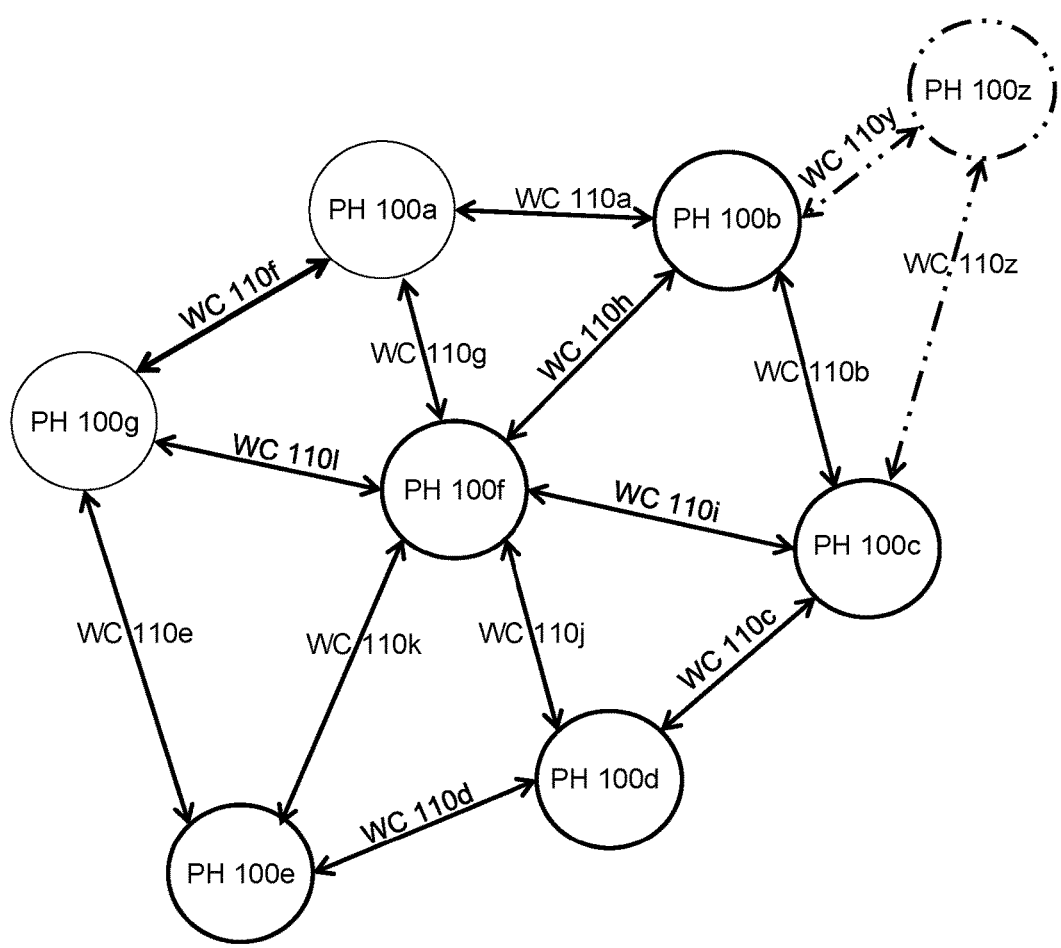

FIGS. 4A-4G illustrates a first example of how the algorithms of FIGS. 3A and 3B may be implemented at a first electrical power-sharing hub and a neighboring electrical power-sharing hub in a wireless mesh network 10 where an electrical power-sharing hub PH 100g requires additional electrical power. The algorithm starts at step 300 with ongoing monitoring by the hub PH 100g of its power needs. One or more controllers 109 at the hub PH 100g may track the electrical power needs of the hub. When electrical power-sharing hub PH 100g recognizes that the electrical power available to it is not sufficient (step 302), as shown in FIG. 4B, electrical power-sharing hub PH 100g transmits a request for additional power to all of its neighboring electrical power-sharing hubs PH 100a, PH 100e, PH 100f using respective wireless links WC 110f, WC 110e, WC 110l (step 304). Upon receipt of the request (step 320), one or more of the neighboring electrical power-sharing hubs PH 100a, PH 100e, PH 100f optionally sends an acknowledgement of the request to electrical power-sharing hub PH 100g in FIG. 4C over respective wireless communication links WC 110f, WC 110e, WC 110l which is received by hub PH 100g (step 306). In FIG. 4D, each of the neighboring electrical power-sharing hubs PH 100a, PH 100e, PH 100f determines whether it has extra available electrical power to share (step 322) and hubs PH 100a, PH 100e, PH 100f then notify each other over respective wireless communication links WC 110g, WC 110k which neighboring electrical power-sharing hub(s), if any, have spare power available (steps 324). If power is available to share at one of the neighboring hubs PH 100a, PH 100e, 100f (steps 308, 325), in FIG. 4E, electrical power-sharing hub PH 100a indicates to electrical power-sharing hub PH 100f and PH 100f indicates to PH 100e via respective wireless communication links WC 100g and WC 110*k* that hub PH 100*a* will handle the power request (step 326). (As noted above, the decision could be alternatively left to hub PH 100*g* to make (step 310)). In FIG. 4F, electrical power-sharing hub PH 100*a* wirelessly transmits power to the requesting hub PH 100*g* over wireless communication link WC 110*f* (step 328). (Two-way communication between hub PH 100*a* and PH 100*g* may continue during this wireless power transfer.) After the electrical power is completely received at hub PH 100*g* (step 312), as shown in FIG. 4G, hubs PH 100*e*, PH 100*f* return to their normal monitoring mode (back to step 300).

FIGS. 5A-5K illustrates a second example in which the algorithms of FIGS. 3A and 3B may be implemented by controller 109. FIGS. 5A-5K also illustrate how an electrical power-sharing hub may both be a requester of electrical power in one instance while electrical power may also be requested of that electrical power-sharing hub by another hub in the wireless mesh network 10.

Figure 5A:
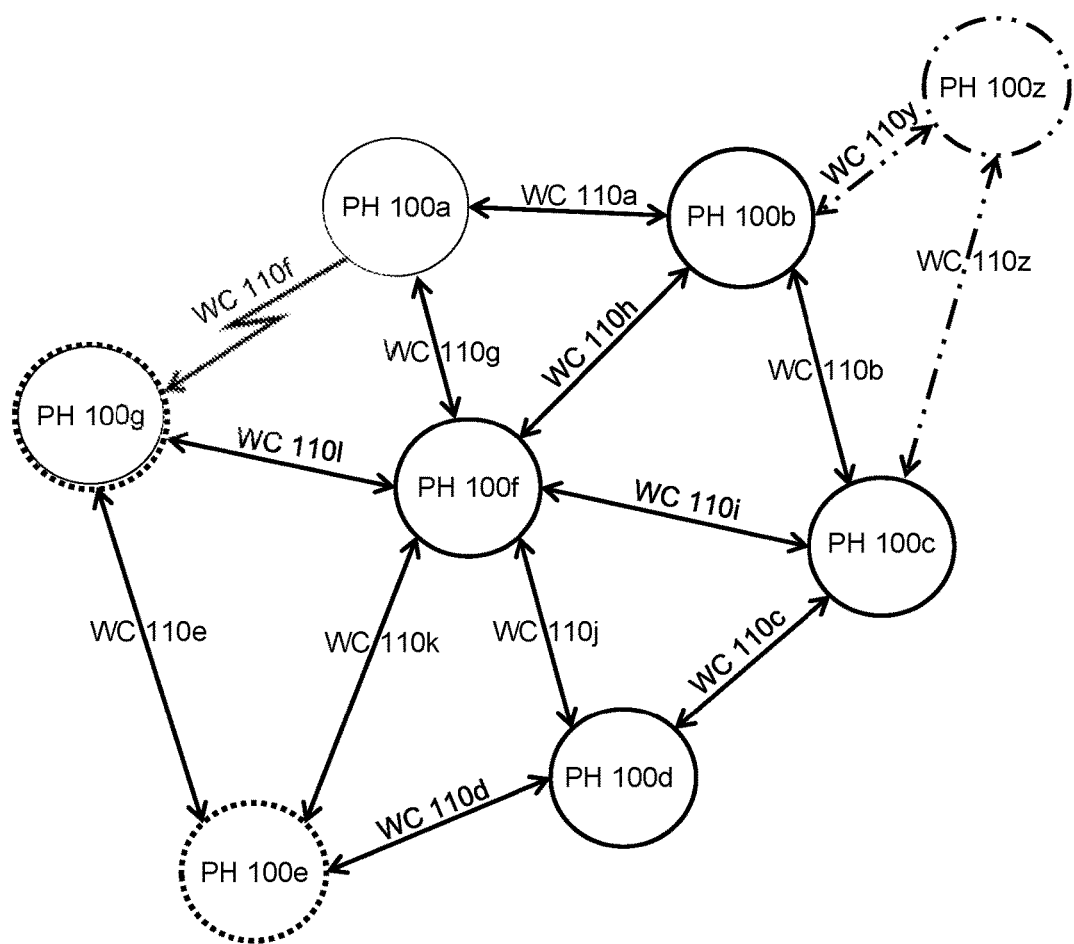
FIGS. 5A-5K illustrate an implementation of the algorithms in accordance with the present invention as performed in a wireless mesh network topology where a second electrical power-sharing hub seeks to obtain additional electrical power wirelessly from another electrical power-sharing hub in the network in accordance with an embodiment of the present invention.

As shown in FIG. 5A, electrical power-sharing hub PH 100*e*, which happens to be a neighbor of the electrical power-sharing hub PH 100*g*, is monitoring the amount of power that hub PH 100*e* has available and compares that value to current or projected requirements (step 300). At step 302, electrical power-sharing hub PH 100*e* realizes that it too requires additional power. In this example, the need for power at the second electrical power-sharing hub PH 100*e* arises while electrical power-sharing hub PH 100*a* is still transmitting electrical power to electrical power-sharing hub PH 100*g* over wireless communication WC 110*f*. (During the wireless power transfer from hub PH 100*a* to hub PH 100*g*, two-way communications between those nodes may continue. Moreover, although not specifically shown by a lightning bolt symbol in FIGS. 5B to 5J, the wireless power transfer from hub PH 100*a* to PH 100*g* may continue until that wireless power transfer is completed.)

Figure 5B:
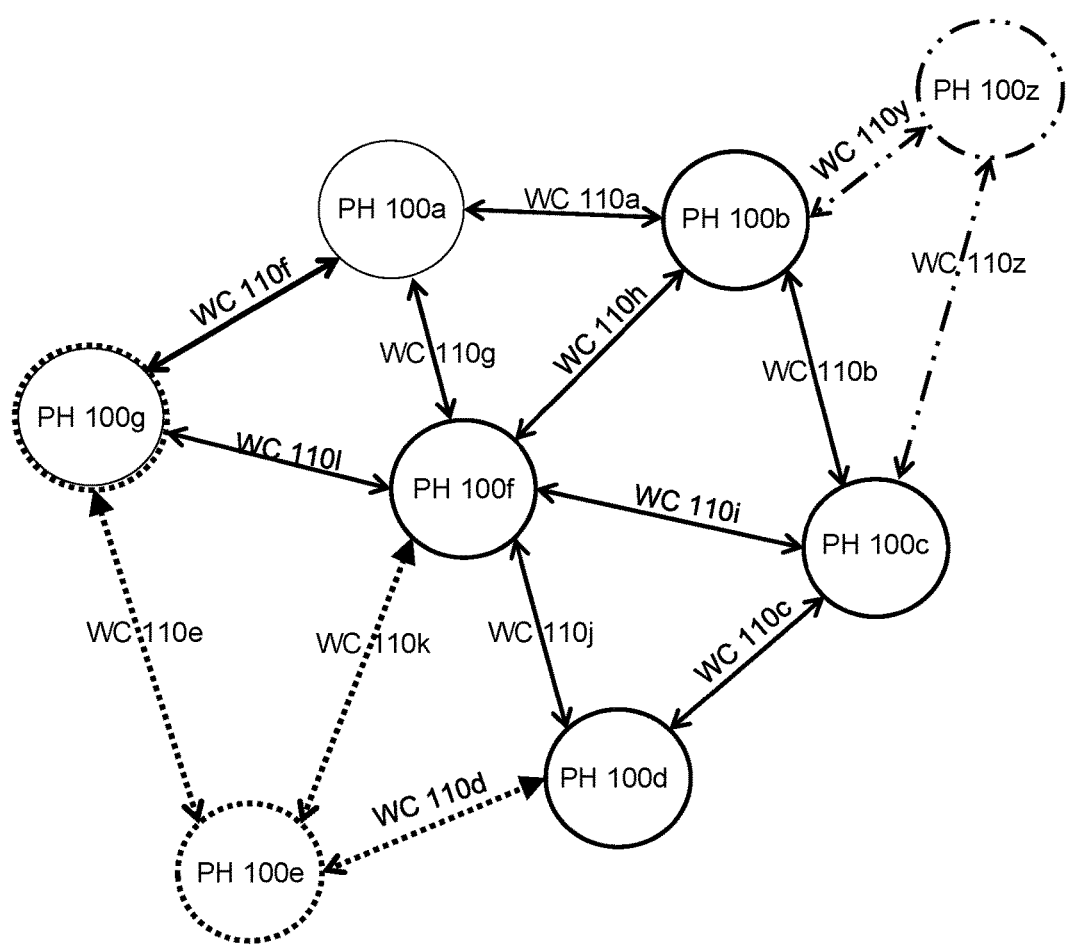
Figure 5C:
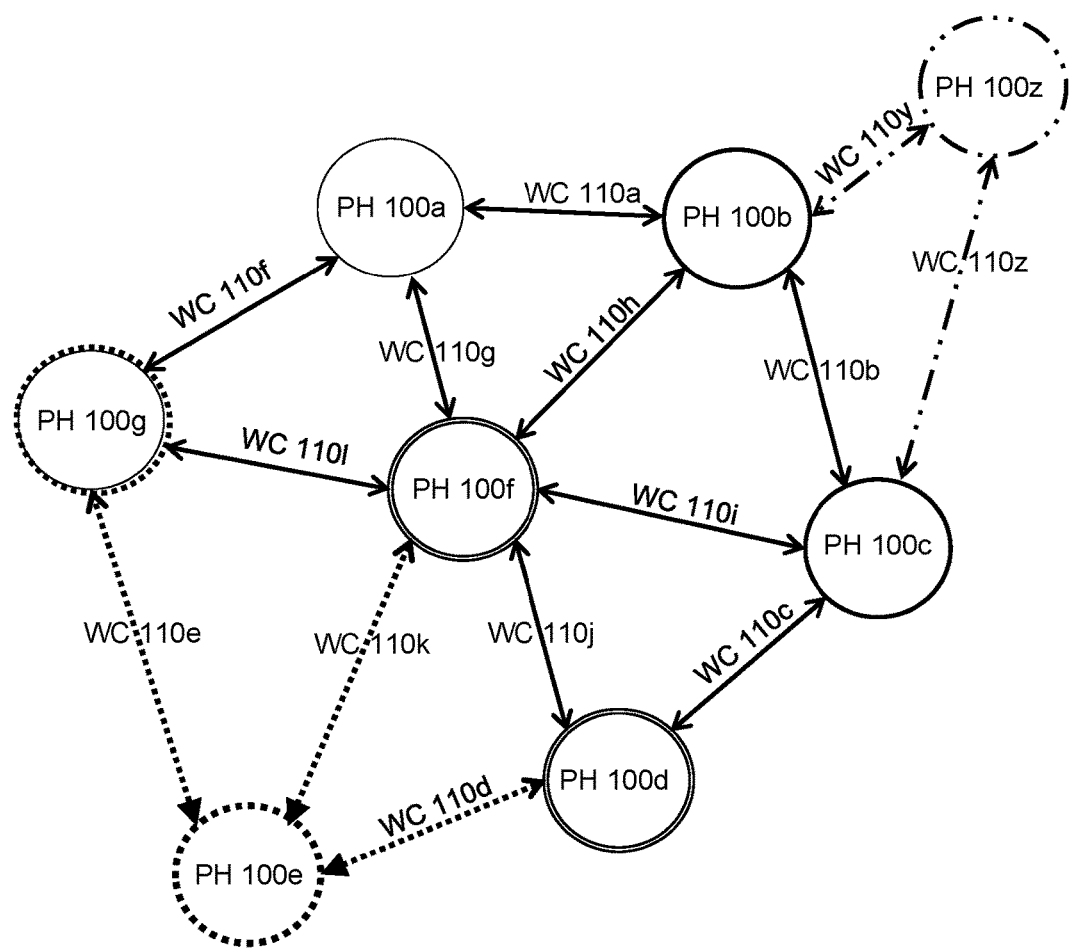
Figure 5D:
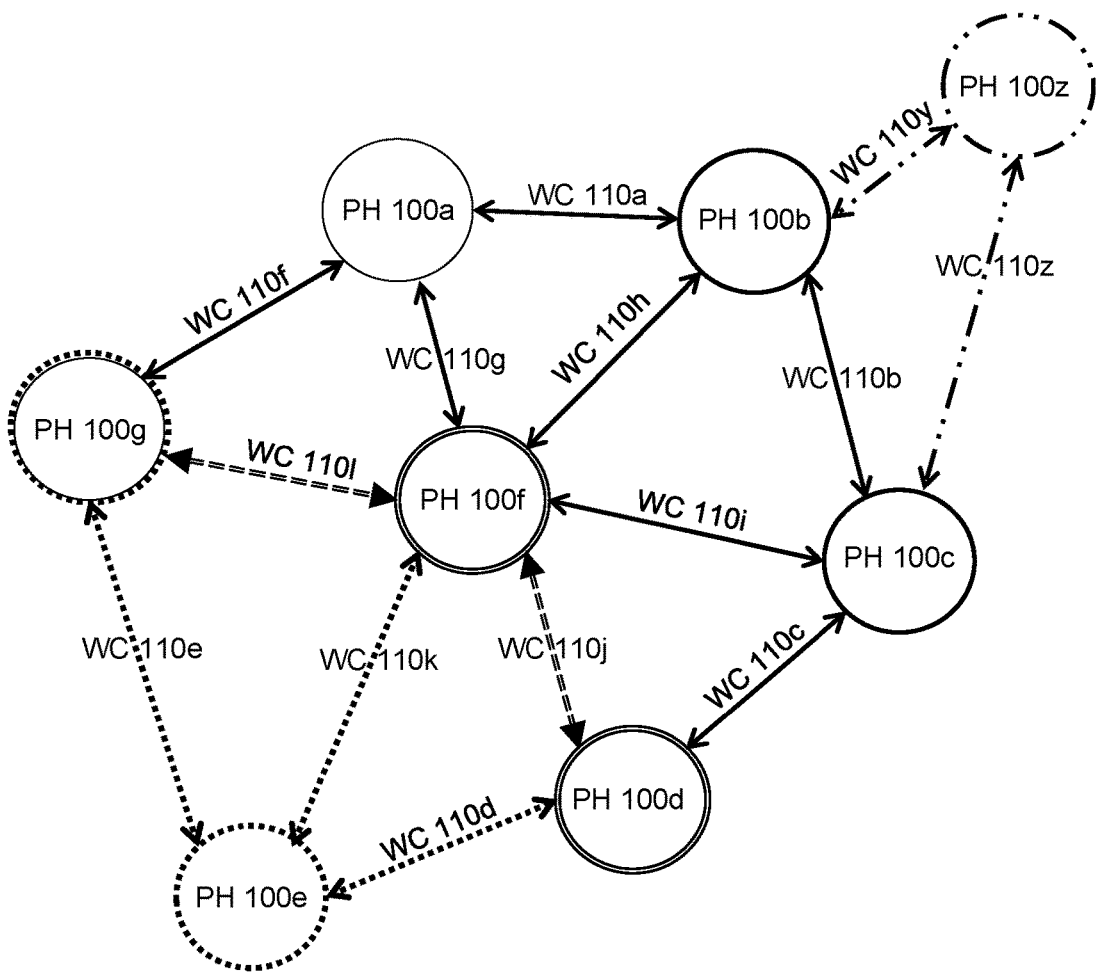

In FIG. 5B, electrical power-sharing hub PH 100*e* transmits a request for additional power to its neighboring electrical power-sharing hubs PH 100*g*, PH 100*f*, PH 100*d* via respective wireless communication links WC 110*e*, WC 110*k*, WC 110*d* (step 304). The request is received at hubs PH 100*g*, PH 100*f*, PH 100*d* (step 320). FIG. 5C shows electrical power-sharing hubs PH 100*g*, PH 100*f*, PH 100*d* acknowledging the request over respective wireless communication links WC 110*e*, WC 110*k*, WC 110*d* and the acknowledgement is received at hub PH 100*e* (step 306). Electrical power-sharing hubs PH 100*g*, PH 100*f*, PH 100*d* also communicate with each other over respective wireless communication links WC 110*l*, WC 110*j*, as shown in FIG. 5D.

Figure 5E:
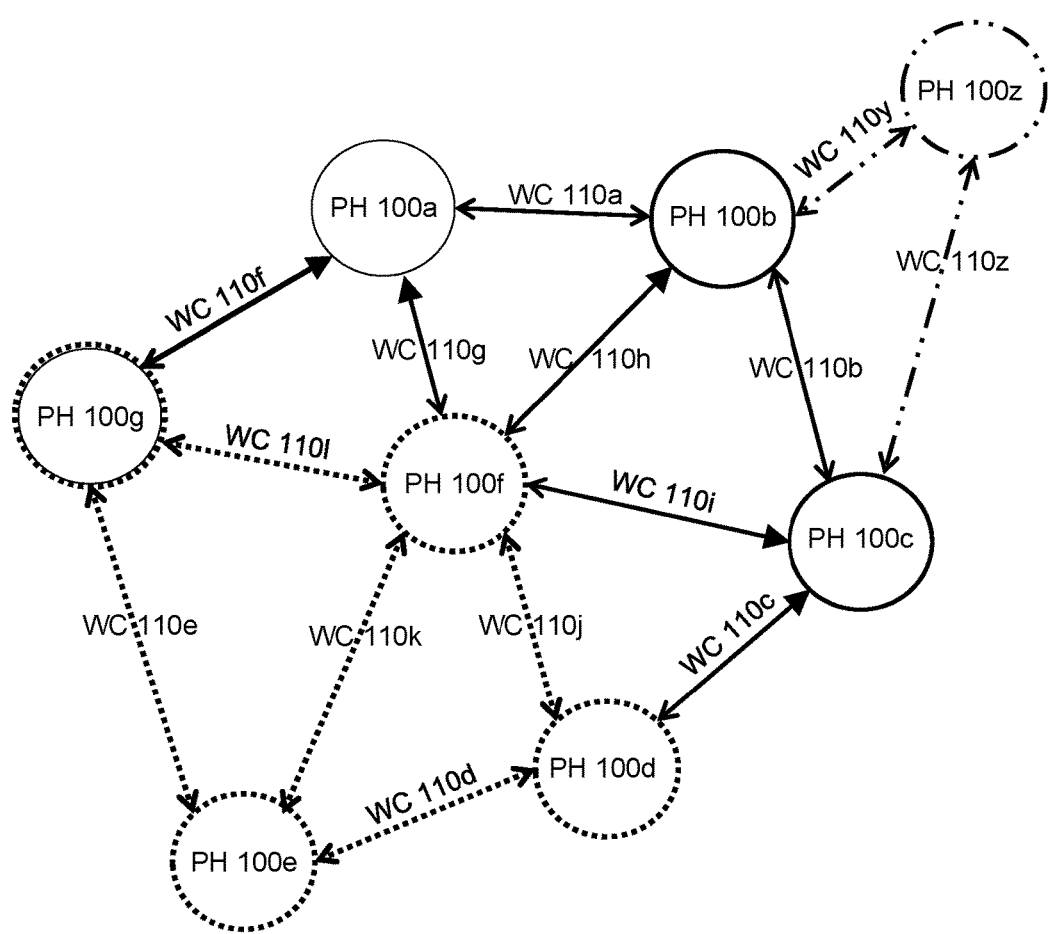
Figure 5F:
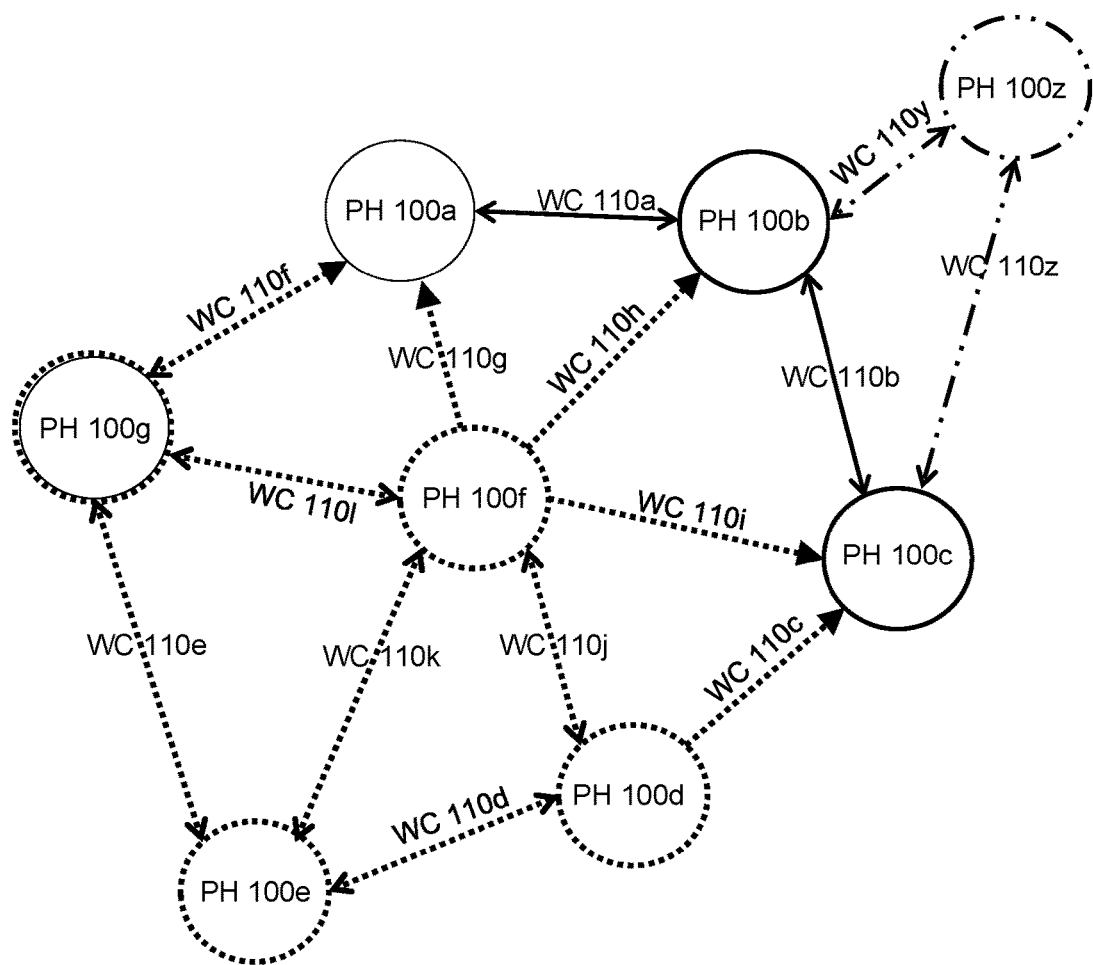
Figure 5G:
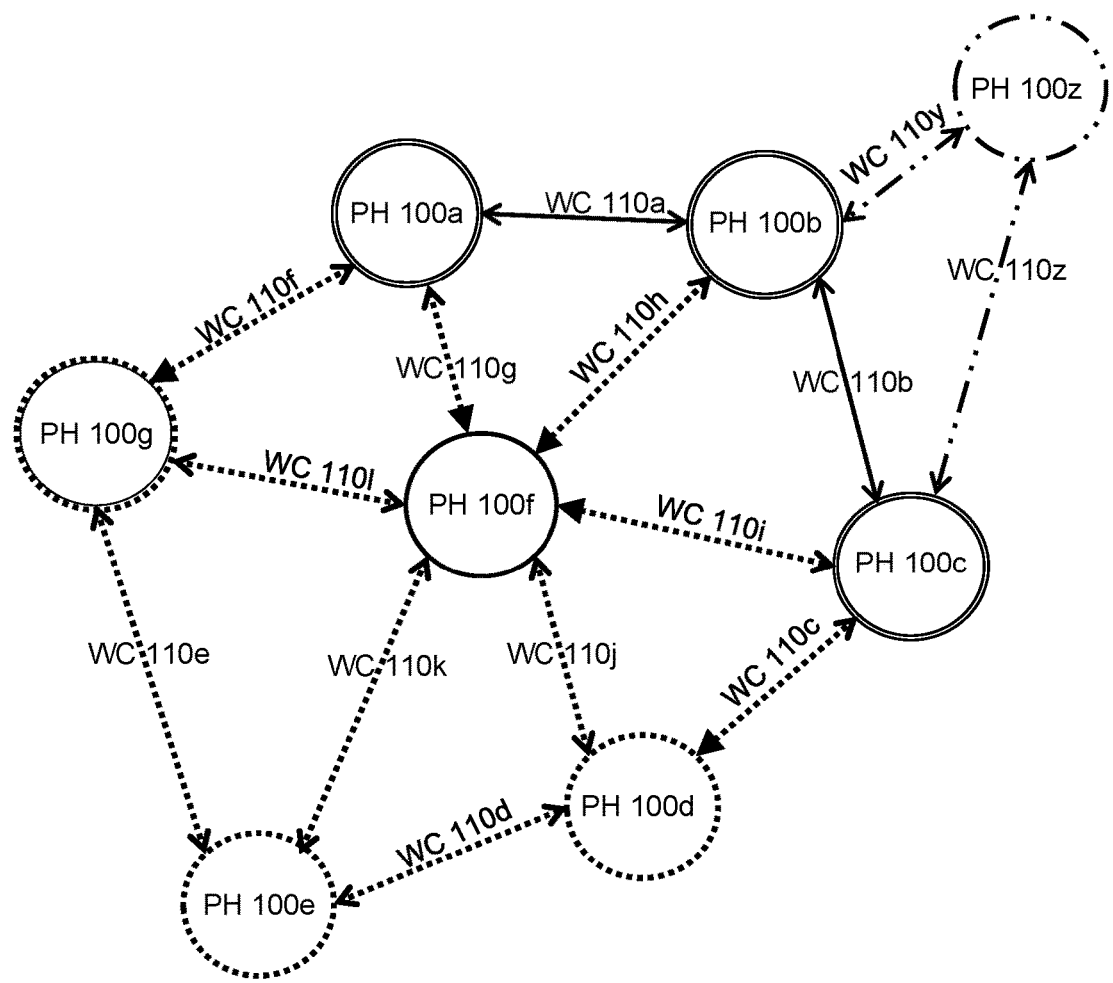

In FIG. 5E, it is determined that none of the neighboring electrical power-sharing hubs PH 100*g*, PH 100*f*, PH 100*d* have sufficient power to share with node PH 100*e* (step 308 and steps 322, 324, 325). As a result, as shown in FIG. 5F, electrical power-sharing hubs PH 100*g*, PH 100*f*, PH 100*d* are in need of power to successfully respond to the request from electrical power-sharing hub PH 100*e* for additional power. Thus, electrical power-sharing hubs PH 100*g*, PH 100*f*, PH 100*d* transmit requests to their neighbors one wireless link further from hub PH 100*e*, which are non-neighboring electrical power-sharing hubs PH 100*a*, PH 100*b*, PH 100*c* in this example, to hub PH 100*e* using wireless communication links WC 110*f*, WC 110*g*, WC 110*h*, WC 110*i*, WC 110*c* (steps 314, 332). (These requests are, in effect, triggered by the request for power by hub PH 100*e*.) As shown in FIG. 5G, electrical power-sharing hubs PH 100*a*, PH 100*b*, PH 100*c* transmit acknowledgements to the requests to requesting electrical power-sharing hubs PH 100*g*, PH 100*f*, PH 100*d* using wireless communication links WC 110*f*, WC 110*g*, WC 110*h*, WC 110*i*, WC 110*c* (step 306).

Figure 5H:
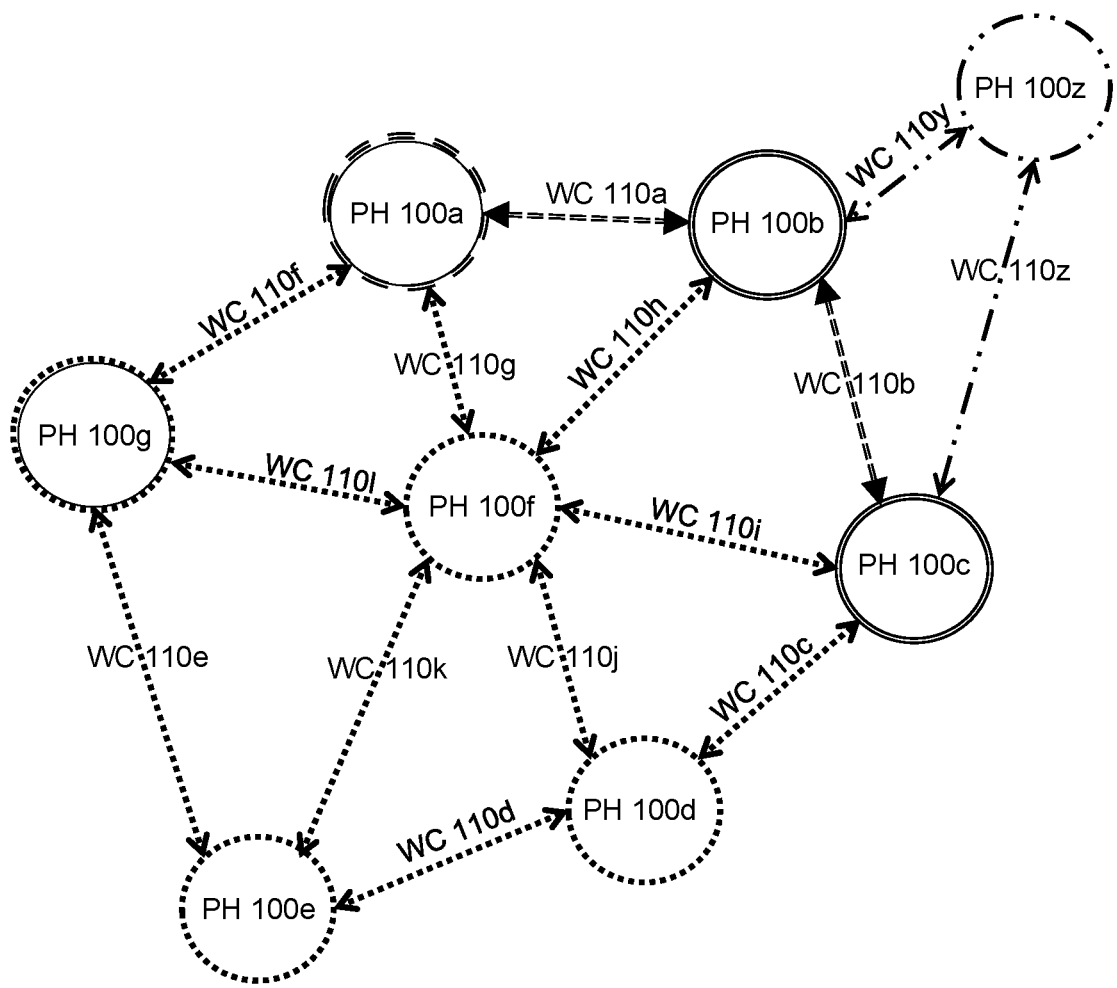
Figure 5I:
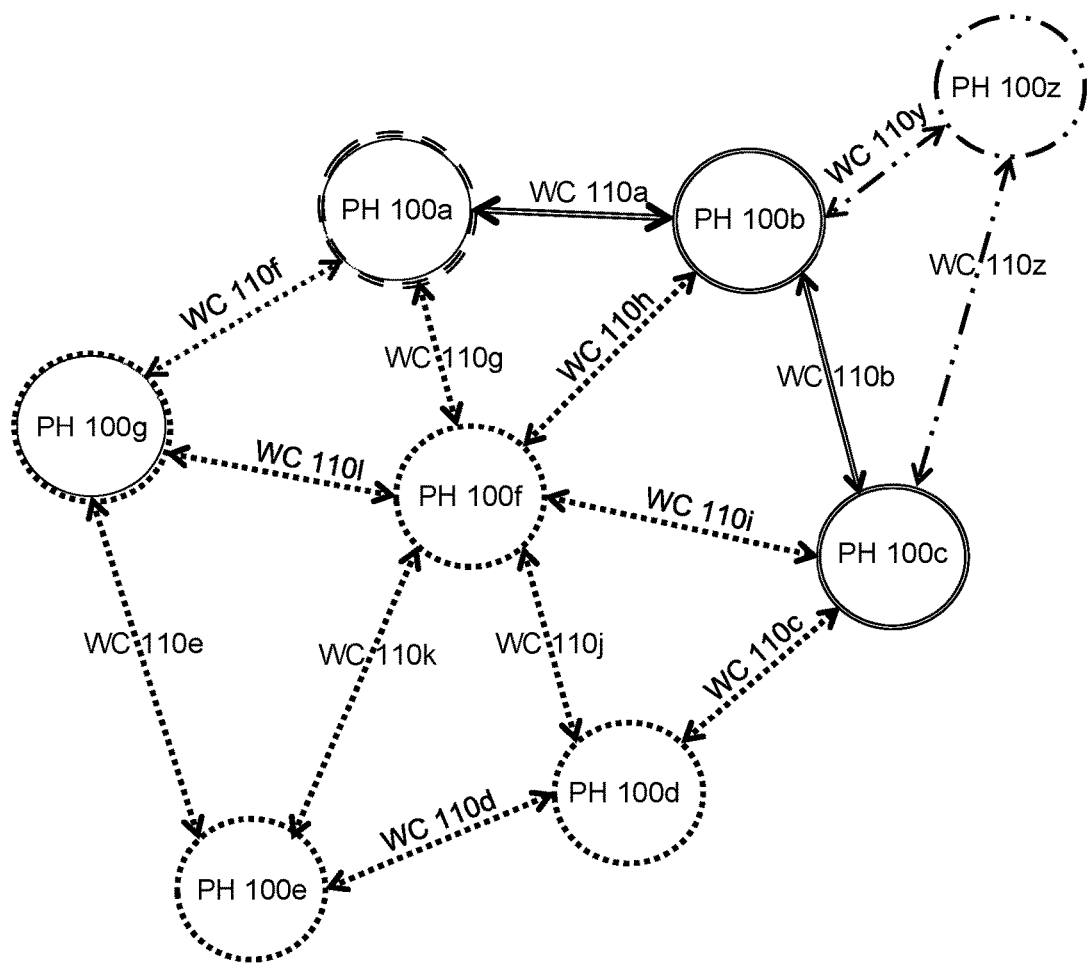
Figure 5J:
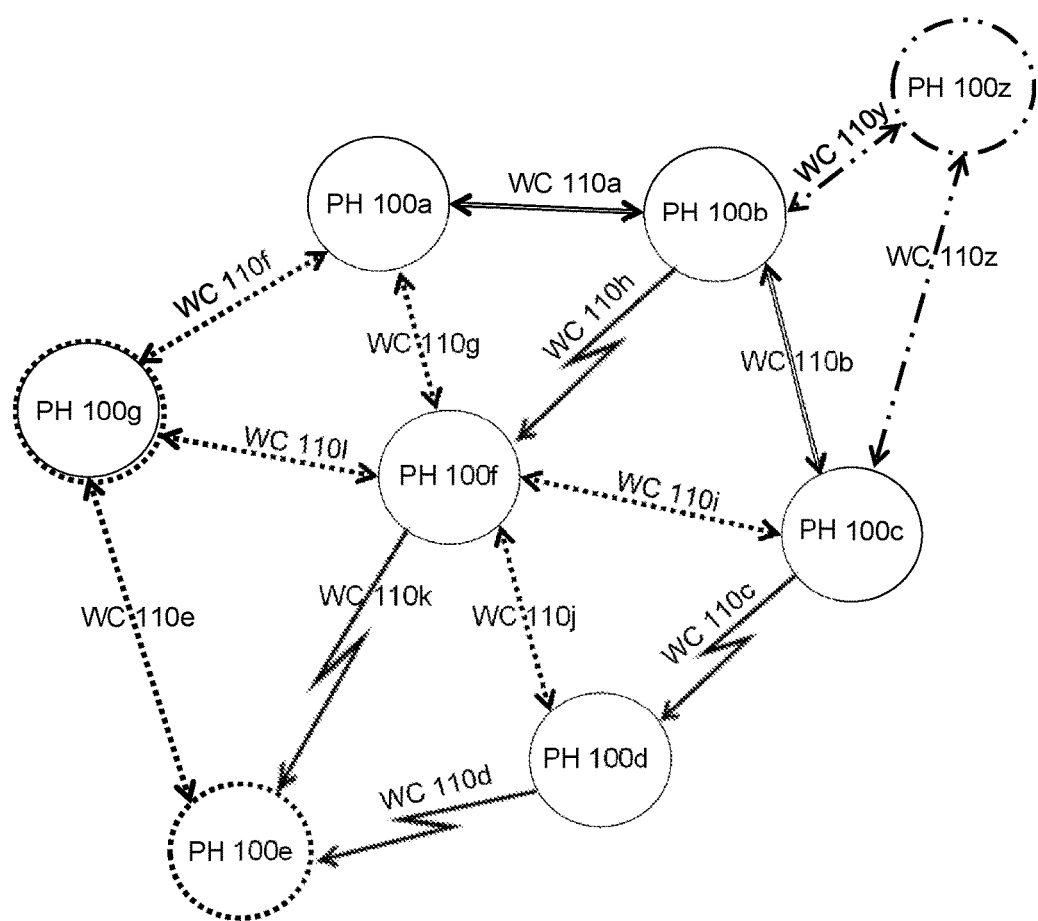
Figure 5K:
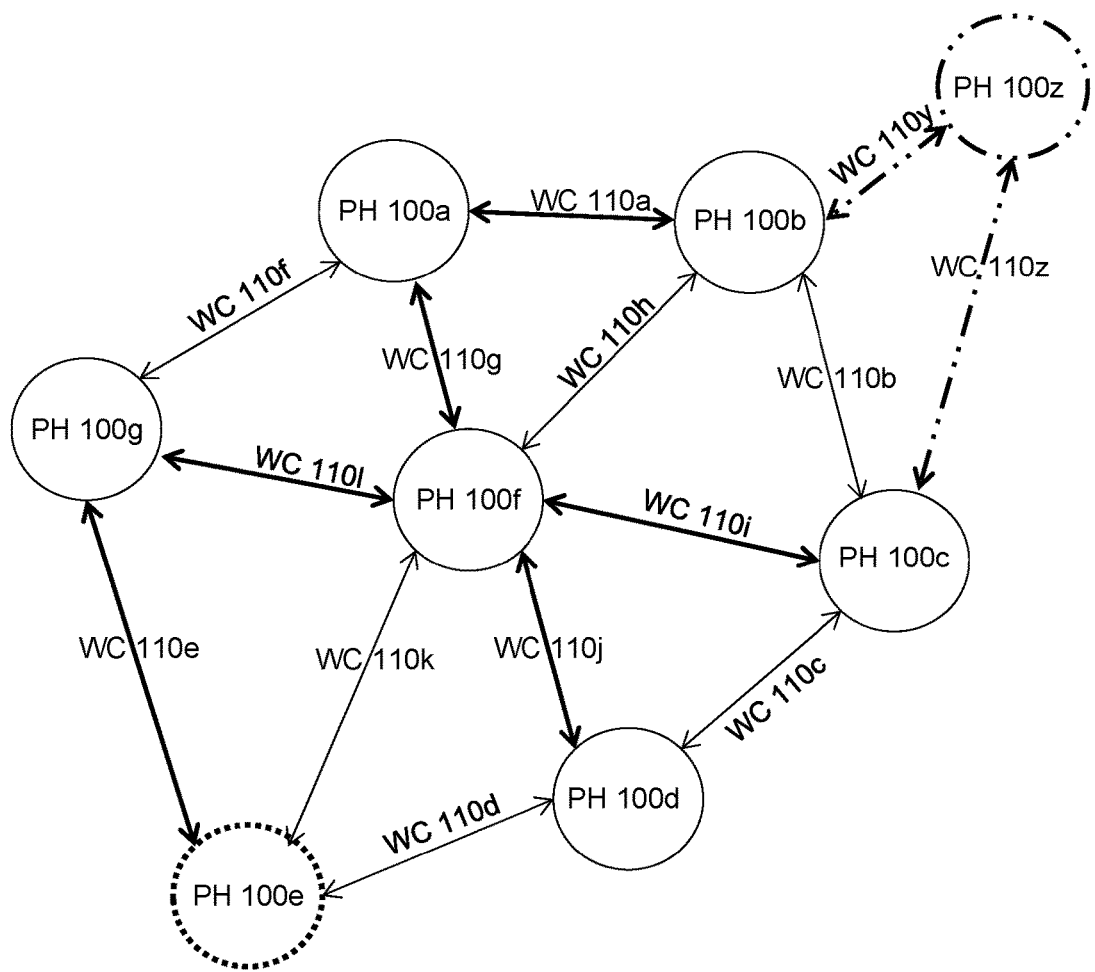

In FIG. 5H, electrical power-sharing hubs PH 100*a*, PH 100*b*, PH 100*c* communicate with each other over wireless communication links WC 110*a*, WC 110*b* to determine if any of them have spare electrical power (steps 308, 333). In FIG. 5I, electrical power-sharing hubs PH 100*b*, PH 100*c* indicate to the other electrical power-sharing electrical power-sharing hub PH 100*a*, using wireless communication links WC 110*a*, WC 110*b*, that they will respond to the power request from electrical power-sharing hub PH 100*e* (step 326) by transmitting electrical power. In FIG. 5J, electrical power-sharing hubs PH 100*b*, PH 100*c* transmit power to the requesting electrical power-sharing hub PH 100*e* through electrical power-sharing hubs PH 100*f*, PH 100*d* via wireless links WC 110*h*, WC 110*k*, WC 110*c*, WC 110*d* and the power is received by the requesting hub PH 100*e* (steps 312, 328). As electrical power-sharing hubs PH 100*a*, PH 100*g* do not provide power to PH 100*e*, they can return to monitoring the wireless mesh network after electrical power-sharing hub PH 100*a* finishes providing power to PH 100*g* (step 300; see FIG. 4G).

The operations illustrated by FIGS. 4A-4G and 5A-5K are only illustrative of some operations that can be achieved by wirelessly sharing power among electrical power-sharing hubs. In an alternative algorithm, rather than wait for power to be requested, an electrical power-sharing hub that has excess power, e.g., electrical power-sharing hub PH 100*g*, may take the initiative and notify a set of other electrical power-sharing hubs in its wireless mesh network that it has available electrical power for sharing wirelessly and the request for power by another electrical power-sharing hub in the network is sent in response to the offer.

In addition to the electrical power-sharing hubs, the wireless mesh network may further include servers (not shown) for various purposes. For example, the servers may include a profile server that maintains a database of operator profiles for the electrical power-sharing hubs, a tracking server to track energy sharing on the network, and an accounting server to invoice operators of hubs that received wireless electrical power and provide payments to operators of hubs that shared power wirelessly.

Among the advantages of wirelessly sharing electrical power in the wireless mesh network 10 in accordance with the present invention are: enabling the bidirectional wireless sharing of electrical power in a manner that provides a wireless mesh network with redundancy to keep electrical loads and devices running in the event of a power outage or heavy power usage at an electrical power-sharing hub; and making possible the sharing electrical power over longer distances because the power may be relayed from one electrical power-sharing hub to the next.

While particular embodiments of the present invention have been shown and described in detail, it would be obvious to those skilled in the art that various modifications and improvements thereon may be made without departing from the spirit and scope of the invention. It is therefore intended to cover in the appended claims all such modifications and improvements that are within the scope of this invention.

What is claimed is:

1. A method for wirelessly sharing electrical power over a wireless mesh network, the wireless mesh network comprising a plurality of electrical power-sharing hubs, including a first electrical power-sharing hub and a first set of one or more neighboring electrical power-sharing hubs that are one wireless link away from the first electrical power-sharing hub, wherein each of the electrical power-sharing hubs comprises one or more transmitters and one or more receivers to respectively transmit and receive wirelessly communications and electrical power, a hub-based power source or a connection to an external power source to power the first electrical power-sharing hub and electrical loads connectable thereto, and one or more controllers, the method comprising:

(a) determining, by the one or more controllers at the first electrical power-sharing hub, whether electrical power is to be requested by the first electrical power-sharing hub from one or more of the plurality of electrical power-sharing hubs other than the first electrical power-sharing hub in the wireless mesh network;

(b) transmitting wirelessly, by the one or more transmitters at the first electrical power-sharing hub when the one or more controllers determine that electrical power is requested, a first request to the first set of one or more neighboring electrical power-sharing hubs to wirelessly obtain a first amount of electrical power from the one or more neighboring electrical power-sharing hubs in the first set; and (c) receiving, by the one or more receivers by wireless transmission from the one or more neighboring electrical power-sharing hubs in the first set to the first electrical power-sharing hub in response to the first request, a second amount of electrical power when the one or more of the neighboring electrical power-sharing hubs has electrical power to share with the first electrical power-sharing hub.

2. The method of claim 1, wherein the second amount of electrical power comprises at least the first amount of electrical power that has been requested.

3. The method of claim 1, wherein the second amount of electrical power comprises a portion of the first amount of electrical power that has been requested.

4. The method of claim 1, wherein the plurality of electrical power-sharing hubs in the wireless mesh network further comprises a second set of one or more non-neighboring electrical power-sharing hubs that are more than one wireless link away from the first electrical power-sharing hub, and wherein the method further comprises:

(d) obtaining by the first electrical power-sharing hub of electrical power that has been requested or a portion thereof from the second set of one or more non-neighboring electrical power-sharing hubs in the wireless mesh network, when the first amount of electrical power is not available for sharing by the first set of one or more of the neighboring electrical power-sharing hubs, by a relay of at least the first amount of electrical power or a portion thereof wirelessly from the one or more non-neighboring electrical power-sharing hubs that has electrical power to share back to the first electrical power-sharing hub via one or more of the neighboring electrical power-sharing hubs intermediate the non-neighboring electrical power-sharing hubs and the first electrical power-sharing hub.

5. The method of claim 4, wherein the step of obtaining by the first electrical power-sharing hub of the first amount of electrical power that has been requested or a portion thereof from a second set of one or more non-neighboring electrical power-sharing hubs in the wireless mesh network further comprises:

transmitting wirelessly, by the first electrical power-sharing hub, a second request to the second set of one or more non-neighboring electrical power-sharing hubs in the wireless mesh network, to request a third amount of electrical power from the second set of one or more non-neighboring electrical power-sharing hubs.

6. The method of claim 5, wherein the third amount of electrical power comprises at least the first amount of electrical power that has been requested.

7. The method of claim 5, wherein the third amount of electrical power comprises a portion of the first amount of electrical power that has been requested.

8. The method of claim 5, wherein the plurality of electrical power-sharing hubs in the wireless mesh network further comprises a third set of one or more non-neighboring electrical power-sharing hubs, and wherein the method further comprises:

transmitting wirelessly, by the first electrical power-sharing hub, a third request for electrical power from the third set of one or more non-neighboring, electrical power-sharing hubs in the wireless mesh network that have not received the second request.

9. The method of claim 4, wherein the step of obtaining by the first electrical power-sharing hub of the first amount of electrical power or a portion thereof from a second set of one or more non-neighboring electrical power-sharing hubs in the wireless mesh network, further comprises:

triggering, as a result of the first request, a second request to be sent by the neighboring electrical power-sharing hubs in the first set of neighboring electrical power-sharing hubs to the second set of one or more non-neighboring electrical power-sharing hubs, to request electrical power for the first electrical power-sharing hub from the second set of one or more non-neighboring electrical power-sharing hubs.

10. The method of claim 9, further comprising:

triggering, as a result of the first request, a third request to be sent by the one or more non-neighboring electrical power-sharing hubs in the second set of one or more non-neighboring electrical power-sharing hubs to request electrical power from a third set of one or more non-neighboring electrical power-sharing hubs in the wireless mesh network that have not received the second request.

11. The method of claim 1, further comprising storing, at the first electrical power-sharing hub, at least a portion of the electrical power that is received wirelessly.

12. The method of claim 1, wherein the step of determining, by the one or more controllers, whether electrical power is to be requested by the first electrical power-sharing hub comprises monitoring whether additional electrical power is required by the first electrical power-sharing hub based on a current or projected electrical load demand for the first electrical power-sharing hub.

13. A method for wirelessly sharing electrical power over a wireless mesh network, the wireless mesh network comprising a plurality of electrical power-sharing hubs, including a first set of one or more neighboring electrical power-sharing hubs comprising at least a first electrical power-sharing hub, a second electrical-power sharing hub not within the first set, wherein the first set of one or more neighboring electrical power-sharing hubs are one wireless link away from the second electrical power-sharing hub, and a second set of one or more non-neighboring electrical power-sharing hubs that are more than one wireless link away from the second electrical power-sharing hub, wherein each of the plurality of electrical power-sharing hubs comprises one or more transmitters and one or more receivers to respectively transmit and receive wirelessly communications and electrical power, a hub-based power source or a connection to an external power source to power the first electrical power-sharing hub and electrical loads connectable thereto, and one or more controllers, the method comprising:

(a) receiving wirelessly, by the one or more receivers at the first electrical power-sharing hub from the second electrical power-sharing hub, a first request for a first amount of electrical power;

(b) determining, by the one or more controllers at the first electrical power-sharing hub, whether electrical power is available at the first electrical power-sharing hub or at the one or more other neighboring electrical power-sharing hubs in the first set that are one wireless link away in the wireless mesh network from the second electrical power-sharing hub to be shared with the second electrical power-sharing hub;

(c) when the electrical power is available at the first electrical power-sharing hub or at the one or more other neighboring electrical power-sharing hubs that are one wireless link away in the wireless mesh network from the second electrical power-sharing hub for sharing with the second electrical power-sharing hub and when the one or more controllers at the first electrical power-sharing hub determines that the first electrical power-sharing hub is to provide the electrical power transmitting wirelessly by the one or more transmitters a second amount of electrical power from the first electrical power-sharing hub to the second electrical power-sharing hub; and (d) when the first amount of power is not available at the first electrical power-sharing hub or at the one or more other neighboring electrical power-sharing hubs for sharing with the second electrical power-sharing hub, (i) transmitting wirelessly, by the first electrical power-sharing hub, a second request to one or more electrical power-sharing hubs in the second set of one or more non-neighboring electrical power-sharing hubs to determine whether the one or more non-neighboring electrical power-sharing hubs in the second set has at least the first amount of electrical power to share with the second electrical power-sharing hub; (ii) receiving wirelessly, by the one or more receivers at the first electrical-power sharing hub from the one or more non-neighboring electrical power-sharing hubs in response to the second request, a third amount of electrical power, when electrical power is available for sharing at the one or more non-neighboring electrical power-sharing hubs, and transmitting wirelessly at least the third amount electrical power that was received to the second electrical power-sharing hub.

14. The method of claim 13, further comprising the step of (iii) triggering a third request to be sent to the second set of non-neighboring electrical power-sharing hubs, to request the first amount of electrical power or a portion thereof from a third set of one or more non-neighboring electrical power-sharing hubs that are not neighbors of the second electrical power-sharing hub when the first amount of electrical power or a portion thereof is not available from the first set or second set of electrical power-sharing hubs.

15. The method of claim 14, wherein the third amount of electrical power comprises at least the first amount of electrical power that has been requested.

16. The method of claim 14, wherein the third amount of electrical power comprises a portion of the first amount of electrical power that has been requested.

17. The method of claim 14, further comprising:

(e) obtaining by the first electrical power-sharing hub of electrical power that has been requested by the first electrical power-sharing hub from a second set of one or more non-neighboring electrical power-sharing hubs in the wireless mesh network by a relay of at least the first amount of electrical power or a portion thereof wirelessly from the one or more non-neighboring electrical power-sharing hubs with the first amount of electrical power or a portion thereof back to the first electrical power-sharing hub via one or more of the plurality of electrical power-sharing hubs intermediate the non-neighboring electrical power-sharing hubs and the first electrical power-sharing hub; and (f) transmitting wirelessly the received electrical power by the first electrical power-sharing hub to the second electrical power-sharing hub.

18. A system for wirelessly sharing electrical power among one or more electrical power-sharing hubs in a wireless mesh network, the system comprising:

a first electrical power-sharing hub comprising:

one or more transmitters for transmitting communications and electrical power wirelessly to other electrical power-sharing hubs in the wireless mesh network;

one or more receivers for receiving communications and electrical power wirelessly from other electrical power-sharing hubs in the wireless mesh network;

a hub-based power source or a connector to an external power source to power the first electrical power-sharing hub and one or more electrical loads connectable to the first electrical power-sharing hub; and one or more controllers that are configured to control the operation of the first electrical power-sharing hub to perform the following steps:

(a) determining whether electrical power is to be requested by the first electrical power-sharing hub from one or more of the plurality of other electrical power-sharing hubs other than the first electrical power-sharing hub in the wireless mesh network;

(b) transmitting wirelessly, by the one or more transmitters, a first request to a first set of one or more neighboring electrical power-sharing hubs, which are one wireless link away in the wireless mesh network from the first electrical power-sharing hub, to wirelessly obtain a first amount of electrical power from the one or more neighboring electrical power-sharing hubs in the first set; and (c) receiving, by the one or more receivers by wireless transmission from the one or more neighboring electrical power-sharing hubs in the first set to the first electrical power-sharing hub in response to the first request, a second amount of electrical power when the one or more of the neighboring electrical power-sharing hubs has electrical power to share with the first electrical power-sharing hub.

19. The system of claim 18, wherein the plurality of electrical power-sharing hubs further comprises a second set of one or more non-neighboring electrical power-sharing hubs that are more than one wireless link away from the first electrical power-sharing hub, wherein the one or more controllers of the first electrical power-sharing hub is further configured to control the operation of the first electrical power-sharing hub to perform the following step:

(d) obtaining by the first electrical power-sharing hub of at least the first amount of electrical power or a portion thereof that has been requested from one or more non-neighboring electrical power-sharing hubs in the wireless mesh network, when the first amount of electrical power is not available for sharing by the first set of one or more of the neighboring electrical power-sharing hubs, by a relay of the first amount of electrical power or a portion thereof wirelessly from the one or more non-neighboring electrical power-sharing hubs with at least the first amount of electrical power or a portion thereof back to the first electrical power-sharing hub via one or more of the plurality of electrical power-sharing hubs intermediate the one or more non-neighboring electrical power-sharing hubs and the first electrical power-sharing hub.

20. The system of claim 19, wherein the one or more controllers are configured to control the operation of the first electrical power-sharing hub to perform the step of obtaining by the first electrical power-sharing hub of at least the first amount of electrical power or a portion thereof from one or more non-neighboring electrical power-sharing hubs in the wireless mesh network by causing the wireless transmission, by the first electrical power-sharing hub, of a second request to the second set of one or more non-neighboring electrical power-sharing hubs in the wireless mesh network, to request at least the first amount of electrical power or a portion thereof from the second set of one or more non-neighboring electrical power-sharing hubs.

21. The system of claim 19, wherein the one or more controllers are configured to control the operation of the first electrical power-sharing hub to perform the step of obtaining by the first electrical power-sharing hub of at least the first amount of electrical power or a portion thereof from one or more non-neighboring electrical power-sharing, hubs in the wireless mesh network by causing the wireless transmission, by the first electrical power-sharing hub, of a third request to be sent by the one or more non-neighboring electrical power-sharing hubs in the second set of one or more non-neighboring electrical power-sharing hubs to request electrical power from a third set of one or more non-neighboring electrical power-sharing hubs in the wireless mesh network that have not received the second request.

22. The system of claim 19, wherein the one or more controllers is configured to control the operation of the first electrical power-sharing hub to perform the step of obtaining by the first electrical power-sharing hub of at least the first amount of electrical power or a portion thereof from one or more non-neighboring electrical power-sharing hubs in the wireless mesh network by
triggering, as a result of the first request, a second request to be sent by the neighboring electrical power-sharing hubs in the first set of neighboring electrical power-sharing hubs to the second set of one or more non-neighboring electrical power-sharing hubs, to request electrical power from one or more electrical power-sharing hubs in the second set of one or more non-neighboring electrical power-sharing hubs.

23. The system of claim 19, wherein the one or more controllers are configured to control the operation of the first electrical power-sharing hub to perform the step of obtaining by the first electrical power-sharing hub of the first amount of electrical power or a portion thereof from one or more non-neighboring electrical power-sharing hubs in the wireless mesh network by
triggering, as a result of the first request, a third request to be sent by the one or more non-neighboring electrical power-sharing hubs in the second set of one or more non-neighboring electrical power-sharing hubs to request electrical power from a third set of one or more non-neighboring electrical power-sharing hubs in the wireless mesh network that have not received the second request.

24. The system of claim 18, wherein the first electrical power-sharing hub further comprises energy storage for storing the electrical power that is received wirelessly.

25. A system for wirelessly sharing electrical power among one or more electrical power-sharing hubs in a wireless mesh network, the system comprising:
a first electrical power-sharing hub comprising:
one or more transmitters for transmitting communications and electrical power wirelessly to other electrical power-sharing hubs in the wireless mesh network;
one or more receivers for receiving communications and electrical power wirelessly from other electrical power-sharing hubs in the wireless mesh network;
a hub-based power source or a connector to an external power source to power the first electrical power-sharing hub and one or more electrical loads connectable to the first electrical power-sharing hub; and
one or more controllers that is configured to control the operation of the first electrical power-sharing hub to perform the following steps:
(a) receiving wirelessly, by the one or more receivers at the first electrical power-sharing hub from the second electrical power-sharing hub, a first request for a first amount of electrical power;
(b) determining, by the one or more controllers, whether electrical power is available at the first electrical power-sharing hub or at one or more other neighboring electrical power-sharing hubs that are one wireless link away in the wireless mesh network from the second electrical power-sharing hub to be shared with the second electrical power-sharing hub;
(c) when electrical power is available at the first electrical power-sharing hub or at the one or more other neighboring electrical power-sharing hubs that are one wireless link away in the wireless mesh network from the second electrical power-sharing hub for sharing with the second electrical power-sharing hub, and, when the one or more controllers determine that the first electrical power-sharing hub is to provide the electrical power, transmitting wirelessly, by the one or more transmitters, a second amount of electrical power requested to the second electrical power-sharing hub;
(d) when the first amount of electrical power is not available at the first electrical power-sharing hub or at the one or more other neighboring electrical power-sharing hubs for sharing with the second electrical power-sharing hub, (i) transmitting wirelessly, by the one or more transmitters at the first electrical power-sharing hub, a second request to a first set of one or more non-neighboring electrical power-sharing hubs that are two wireless links away in the wireless mesh network from the second electrical power-sharing hub, to determine whether the one or more non-neighboring electrical power-sharing hubs has the first amount of electrical power or a portion thereof to share with the first electrical power-sharing hub; and (ii) receiving, by the one or more receivers, a third amount of electrical power when available wirelessly from the one or more non-neighboring electrical power-sharing hubs and transmitting wirelessly the received electrical power to the second electrical power-sharing hub.

26. The system of claim 25, wherein the one or more controllers are further configured to perform the step of (iii)

requesting the first amount of electrical power or a portion thereof from the one or more non-neighboring electrical power-sharing hubs that are at least three wireless links away from the second electrical power-sharing hub when the first amount of electrical power or a portion thereof is not available from the one or more neighboring electrical power-sharing hubs or from the one or more non-neighboring electrical power-sharing hubs that are two wireless links away from the second electrical power-sharing hub.

* * * * *